United States Patent
Chakraborty et al.

(10) Patent No.: US 10,050,515 B1
(45) Date of Patent: Aug. 14, 2018

(54) VOLTAGE CONTROL OF FLYING CAPACITOR IN ADAPTIVE MULTILEVEL CONVERTERS

(71) Applicant: Texas Instruments Incorporated, Dallas, TX (US)

(72) Inventors: Sombuddha Chakraborty, Redwood City, CA (US); Jeff Lee Nilles, Los Altos, CA (US); Mervin John, Menlo Park, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/859,088

(22) Filed: Dec. 29, 2017

(51) Int. Cl.
  *G05F 1/613* (2006.01)
  *G05F 3/16* (2006.01)
  *G05F 1/46* (2006.01)
  *G05F 1/445* (2006.01)
  *H02M 1/00* (2006.01)
  *H02M 1/32* (2007.01)
  *H02M 3/158* (2006.01)

(52) U.S. Cl.
  CPC ........... *H02M 1/32* (2013.01); *H02M 3/1588* (2013.01); *H02M 2001/0054* (2013.01); *H02M 2001/322* (2013.01)

(58) Field of Classification Search
  CPC ........ G05F 1/595; H02M 3/156; H02M 3/158
  USPC .............. 323/223–226, 349, 350; 363/78, 79
  See application file for complete search history.

(56) References Cited

U.S. PATENT DOCUMENTS

| 2014/0376287 | A1* | 12/2014 | Narimani | H02M 3/07 363/60 |
| 2016/0118886 | A1* | 4/2016 | Zhang | H02M 3/158 323/271 |
| 2016/0190921 | A1* | 6/2016 | Kumar | H02M 3/158 323/271 |
| 2016/0315539 | A1* | 10/2016 | Lee | H02M 3/158 |
| 2016/0329809 | A1* | 11/2016 | Granato | H02M 3/158 |

* cited by examiner

*Primary Examiner* — Gary Nash
(74) *Attorney, Agent, or Firm* — Michael A. Davis, Jr.; Charles A. Brill; Frank D. Cimino

(57) ABSTRACT

In described examples, a DC-DC converter provides electrical power. The converter includes an inductor and a flying capacitor. In response to an input voltage transitioning from below a normal operation threshold to above the threshold, a first transition phase and a second transition phase are repeatedly performed. The first transition phase comprises coupling an input terminal of the inductor to a ground, and the second transition phase comprises delivering power through the inductor by discharging the flying capacitor through the inductor. After the input voltage is above the normal operation threshold, and a voltage across the flying capacitor has reached a target voltage proportional to the input voltage, a charging phase, a freewheeling phase and a discharging phase are repeatedly performed. The charging phase comprises charging the flying capacitor by coupling the flying capacitor to the input voltage, and delivering current from the input voltage through the inductor. The freewheeling phase comprises coupling the input terminal to the ground. The discharging phase comprises coupling the capacitor to the input terminal to deliver current from the flying capacitor and discharge the flying capacitor through the inductor.

25 Claims, 17 Drawing Sheets

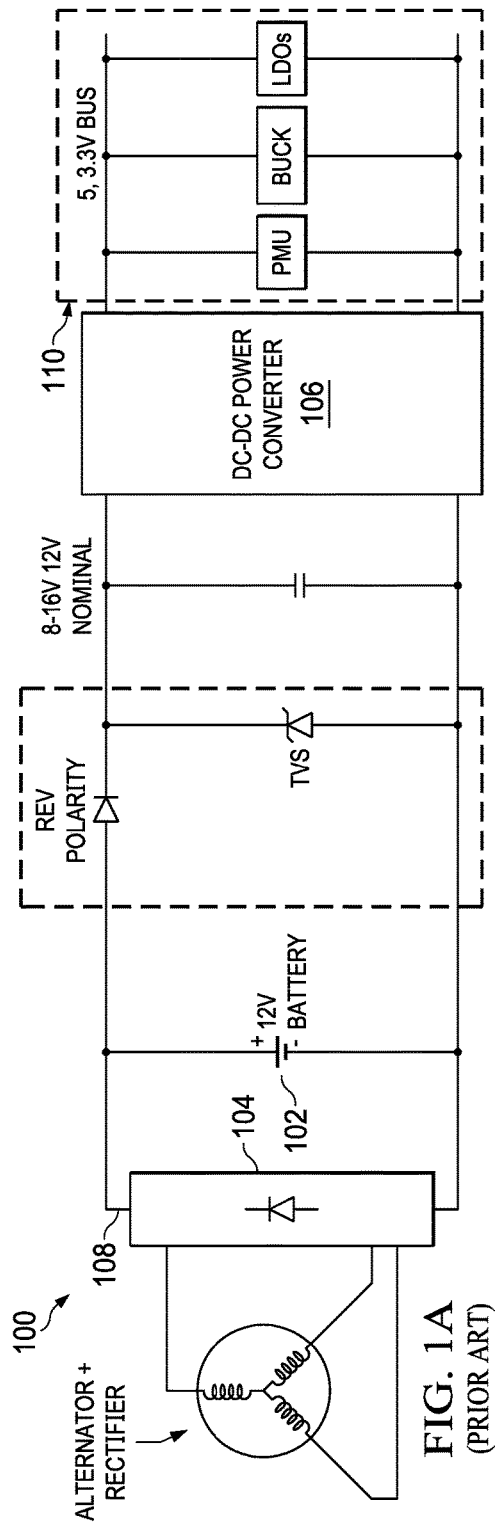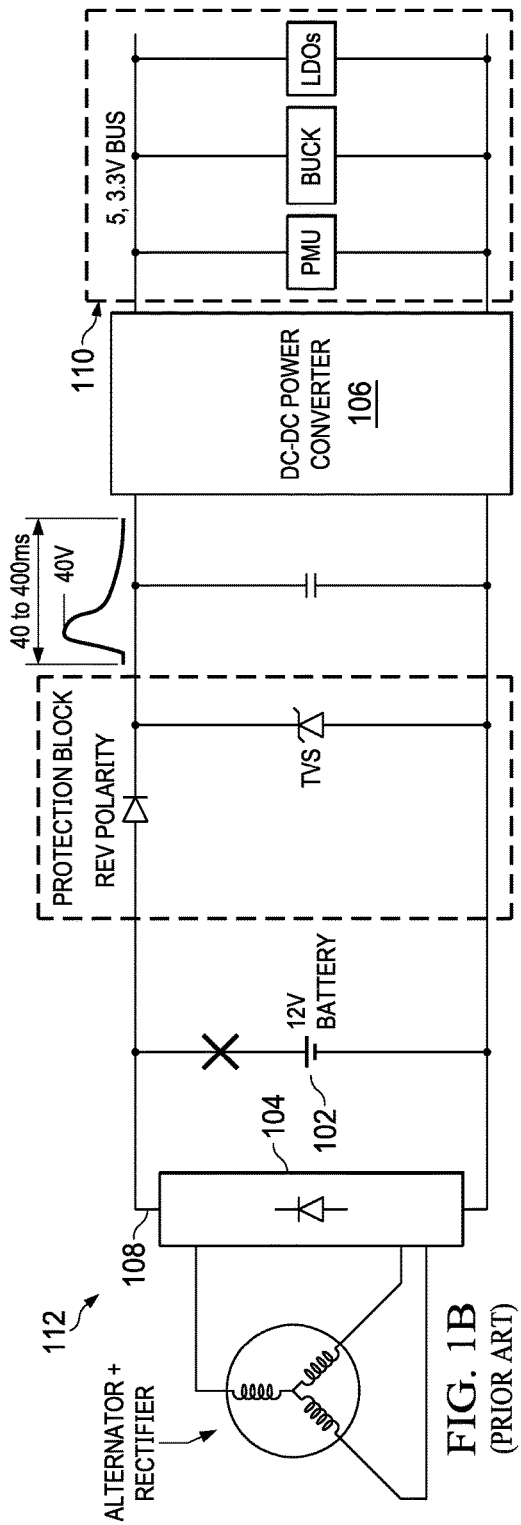

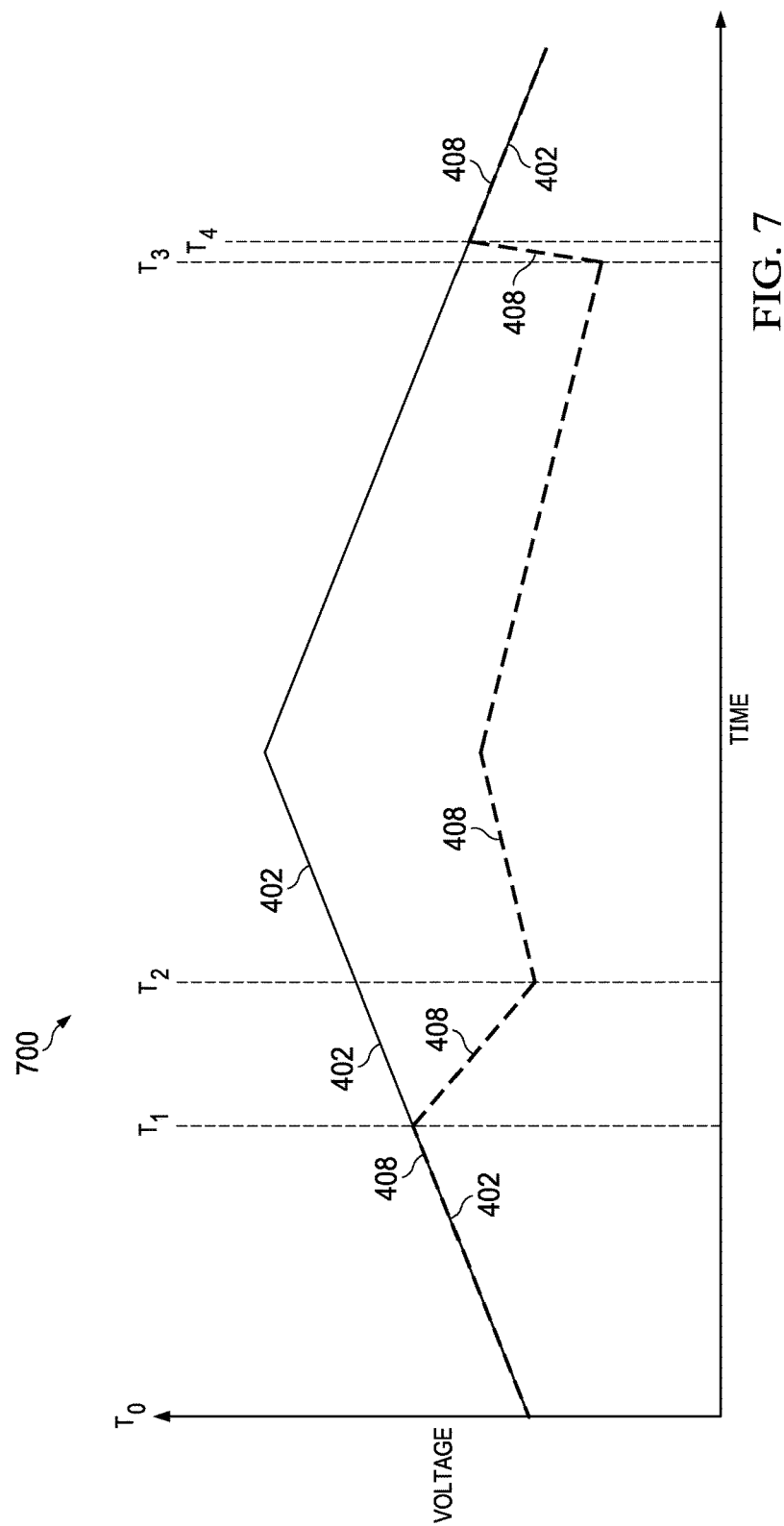

we VOLTAGE CONTROL OF FLYING
CAPACITOR IN ADAPTIVE MULTILEVEL
CONVERTERS

CROSS-REFERENCES TO RELATED
APPLICATIONS

This application is related to co-pending co-assigned U.S. patent application Ser. No. 15/859,301, filed on Dec. 29, 2017 and to co-pending co-assigned U.S. patent application Ser. No. 15/859,039, filed Dec. 29, 2017.

BACKGROUND

This relates generally to DC-DC converters, and more particularly to DC-DC converters using a flying capacitor in a low voltage and high voltage operating environment.

FIG. 1A schematically shows an example of an automotive power delivery path in a normal operation mode 100. As shown in FIG. 1A, a 12 volt battery 102, an alternator and rectifier 104, and a DC-DC power converter 106 are connected in parallel to a bus 108, such that the alternator and rectifier 104 charges the battery 102. The converter 106 shapes the power signal delivered to the other devices 110 on the vehicle. The converter 106 will typically receive a power signal between 8 and 16 volts (generally, up to 20 volts) and convert it to, e.g., 3.3 volts or 5 volts.

FIG. 1B schematically shows an example of an automotive power delivery path in a load dump operation mode 112. Disconnection of the vehicle battery 102 from the alternator (and rectifier) 104 while the battery 102 is being charged is called a "load dump." Vehicle battery 102 disconnection can be caused by various conditions, such as power cable corrosion, poor connections within the power circuit, or an intentional battery disconnect while the vehicle is running. When a terminal of the battery 102 is disconnected, inductive current from the alternator and rectifier 104 continues to be provided to the bus 108. Magnitude of current supplied by an alternator is controlled by the current in the field winding. Load dumps result in voltage surges that are typically brief (e.g., 40 ms to 400 ms), comprising inductive current through the bus 108 at significantly more than 8 to 16 volts; generally, up to 40 volts. The voltage surge is caused by the alternator's 104 regulator being unable to decrease the field current fast enough to prevent the current provided by the alternator 104 from causing the voltage on the bus 108 to significantly increase. Generally, the converter 106 comprises switches (typically transistors) that are rated to handle the maximum 40 volt signal that can be received during a load dump voltage surge.

FIG. 2 shows an example graph of voltage against time 200 for a voltage received by a converter 106 from an automotive battery 102. As shown in FIG. 2, while voltage of an automotive power signal 202 (pre-converter 106) mostly stays well under 20 volts 204, that voltage can—generally rarely, e.g., 0.1% of usage lifetime—spike as high as 40 volts 206. Generally, as further described with respect to FIG. 5E, lower-voltage-rated transistors are more efficient, can be switched faster, take up less device area, and can have better figures of merit (better figures of merit generally relating to lower impedances, lower impedances correlating with increased efficiency) than higher-voltage-rated transistors. This means that for 99.9% of their usage lifetime, 40 volt transistors in a converter 106 are over-rated for their purpose.

FIG. 3 schematically shows an example buck converter 300. Generally, a buck converter is a DC-DC power converter which steps down voltage and steps up current from the converter's input (supply) to its output (load). In the buck converter 300 as shown in FIG. 3, an input voltage Vin 302 is connected to the drain of a first transistor 304. The source of the first transistor 304 is connected to the drain of a second transistor 306 and a first terminal of an inductor 308. The source of the second transistor 306 is connected to ground GND 310. The gate of the first transistor 304 is biased by a control signal Q1 312, and the gate of the second transistor 306 is biased by a control signal Q2 314. A capacitor 316 and a resistor 318 are connected in parallel between a second terminal of the inductor 308 and GND 310. The voltage at the second terminal of the inductor 308 comprises an output voltage Vout 320 of the converter 300.

The first and second transistors 304, 306 are generally controlled such that a transistor turns on (is activated to become conductive) after the other turns off (to prevent a short from Vin 302 to GND 310). Accordingly, only one of the two transistors 304, 306 is on at a given time. Consequently, the first transistor 304 and the second transistor 306 will be required to withstand the full input voltage Vin 302: when the first transistor 304 is on, the second transistor 306 will have voltage Vin 302 between its drain and source, and when the second transistor 306 is on, the first transistor 304 will have voltage Vin 302 between its drain and source.

When the first transistor 304 is on, current flows from Vin 302 across the inductor 308. Current through the inductor 308 is described by $$V = L\frac{dI}{dt},$$

where V and I are voltage across and current through the inductor 308, respectively, and L is inductance of the inductor 308. During this period, the voltage across the inductor is V=Vin−Vout, because the first transistor 304 connects the inductor 308 to Vin 302. Because a buck converter steps voltage down across an inductor, Vin is greater than Vout. Therefore, V is positive, current increases, and energy is delivered across the inductor 308 when the first transistor 304 is on.

When the second transistor 306 is on, current flows from GND 310 across the inductor 308. During this period, the voltage across the inductor 308 is V=−Vout, because the second transistor 306 connects the inductor 308 to GND 310. Therefore, V is negative and current decreases, ramping down energy (V*I) delivered across the inductor 308 when the second transistor 306 is on.

The integral of voltage across the inductor 308 over time should generally equal (or converge to) zero to prevent current through the inductor 308 from rising without limit; this is the zero voltage condition. The duty cycles of the first and second transistors 304, 306 are generally selected to satisfy this condition. Specifying D as the duty cycle of the first transistor 304 and 1−D as the duty cycle of the second transistor 306, the zero voltage condition can be expressed as:

$D*(Vin-Vout)+(1-D)*(-Vout)=0$

This simplifies to $$D = \frac{Vout}{Vin}$$

and Vout=D*Vin. Because power delivered by the input side equals power received by the output side (ignoring losses due to, for example, resistive elements), Vin*Iin=Vout*Iout, where Iin is the input current and Iout is the output current. This further shows that, when the zero voltage condition is satisfied, Iin=D*Iout.

SUMMARY

In described examples, a DC-DC converter provides electrical power. The converter includes an inductor and a flying capacitor. In response to an input voltage transitioning from below a normal operation threshold to above the threshold, a first transition phase and a second transition phase are repeatedly performed. The first transition phase comprises coupling an input terminal of the inductor to a ground, and the second transition phase comprises delivering power through the inductor by discharging the flying capacitor through the inductor. After the input voltage is above the normal operation threshold, and a voltage across the flying capacitor has reached a target voltage proportional to the input voltage, a charging phase, a freewheeling phase and a discharging phase are repeatedly performed. The charging phase comprises charging the flying capacitor by coupling the flying capacitor to the input voltage, and delivering current from the input voltage through the inductor. The freewheeling phase comprises coupling the input terminal to the ground. The discharging phase comprises coupling the capacitor to the input terminal to deliver current from the flying capacitor and discharge the flying capacitor through the inductor.

BRIEF DESCRIPTION OF THE DRAWINGS

FIG. 1A schematically shows an example of an automotive power delivery path in a normal operation mode.

FIG. 1B schematically shows an example of an automotive power delivery path in a load dump operation mode.

FIG. 7 shows an example graph of voltage over time for a DC-DC converter.

DETAILED DESCRIPTION OF EXAMPLE EMBODIMENTS

Figure 2:
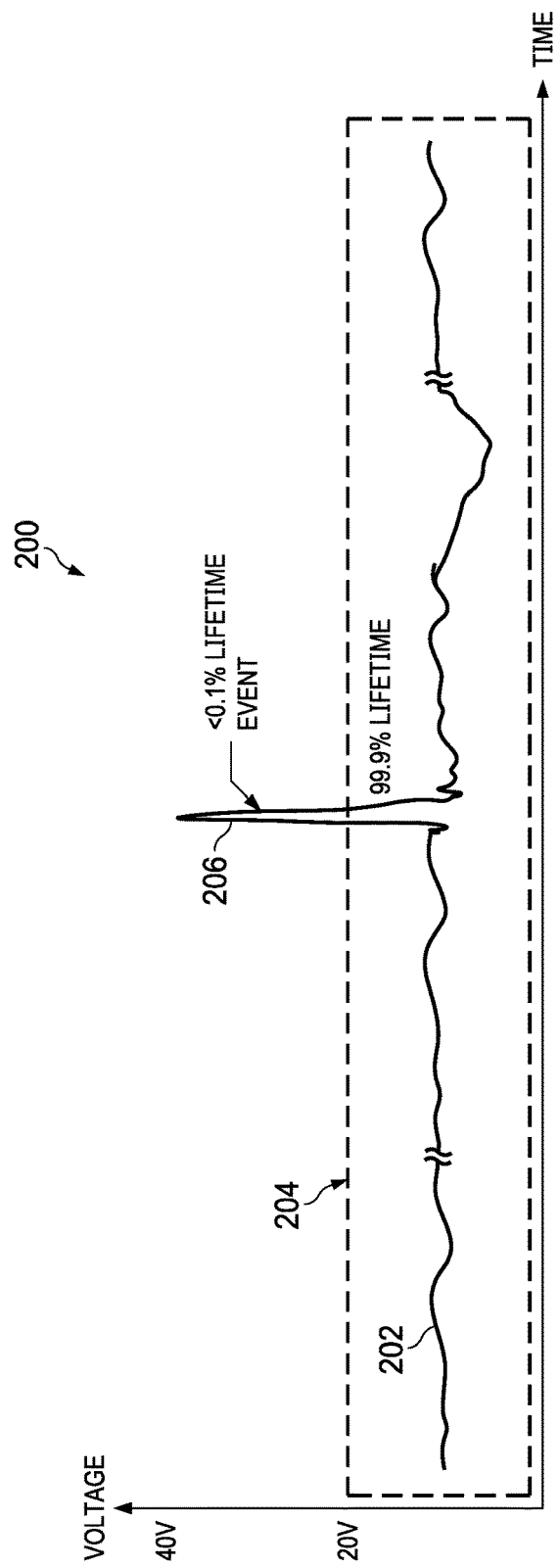
FIG. 2 shows an example graph of voltage against time for a voltage received by a DC-DC converter from an automotive battery.

Example embodiments include approaches to charging a flying capacitor during multi-level DC-DC converter startup to enable use of a low voltage high side transistor. Also, example embodiments include approaches to adjusting and maintaining voltage of a flying capacitor in a DC-DC converter during load dump operation, and during transitions between normal operation and load dump operation. Further, example embodiments include approaches to control startup and provision of power using a DC-DC converter that is specified to, at different times, operate with low voltage and high voltage, but with transistors rated for the low voltage instead of the high voltage. Moreover, example embodiments include methods, devices and systems for operation of a DC-DC converter in a power transmission environment that is subject to nominal input voltages and transient high input voltages.

Also, example embodiments include approaches to efficiently deliver power through a DC-DC converter, such that a relatively simple control scheme can be used when input voltage is normal, and a multi-level control scheme can be used to prevent converter transistors from receiving more than normal input voltage when input voltage substantially increases (e.g., doubles or more).

Multiple related approaches, which can be combined in potentially synergistic ways, are described hereinbelow in Sections I, II and III, whose titles are not limiting. Section I relates to a DC-DC converter with both: a normal voltage mode having a relatively simple switching operation; and a load dump (high voltage) operation mode having a multi-level switching operation, which enables use of low voltage switching transistors. Section II relates to voltage tracking and control to charge a flying capacitor of a multi-level DC-DC converter during startup (before the converter beginning regulation), which enables use of low voltage high side transistors. Section III relates to adjusting and maintaining flying capacitor voltage during load dump operation, and during transitions between normal operation and load dump operation.

Some example parameters are set forth herein to illustrate the relations between these and other parameters. However, these values are merely illustrative, and are modifiable by scaling of further device generations, and are further modifiable for adaptation to different materials or architectures if used.

Section I. Simple Switching Normal Operation and Multi-Level Switching Load Dump Operation Converter with Flying Capacitor Embodiments described herein enable a DC-DC converter that ordinarily operates at a nominal voltage level, but experiences voltage surges (high-voltage transients), to address those voltage surges using a multi-level control scheme (e.g., three levels) and a flying capacitor (a capacitor used as a charge pump during certain phases of operation) to limit the voltage across individual devices comprising the converter during a voltage surge to the nominal voltage level. The converter therefore avoids using transistors rated for the maximum voltage that may be received during a rare power surge, and instead uses transistors rated for the maximum voltage that may be received during normal operation.

As further described with respect to examples in FIGS. 4 and 5E, the converter receives an input voltage Vin, which during normal operation remains at or below a nominal level (e.g., Vin≤20 volts). During high voltage transients (e.g., input voltage Vin>20 volts), the flying capacitor implements a shunt block to reduce maximum voltage across transistors to $$\frac{Vin}{2}.$$

(The flying capacitor can also reduce the maximum voltage across transistors to another target voltage that prevents transistors from blocking a voltage in excess of their breakdown voltage.) When the converter is in a high voltage transient state, the flying capacitor is connected to the power transfer path and is used to carry a portion (e.g., half) of the transient input voltage so that other devices in the converter are also limited to carrying a portion (e.g., half) of the surge-level input voltage. Preferably, during ordinary operation, the converter operates using a simplified (e.g., two level) control scheme and the flying capacitor is connected to ground (not operatively connected to the power transfer path), so that the devices in the converter carry the nominal-level input voltage.

Figure 4:
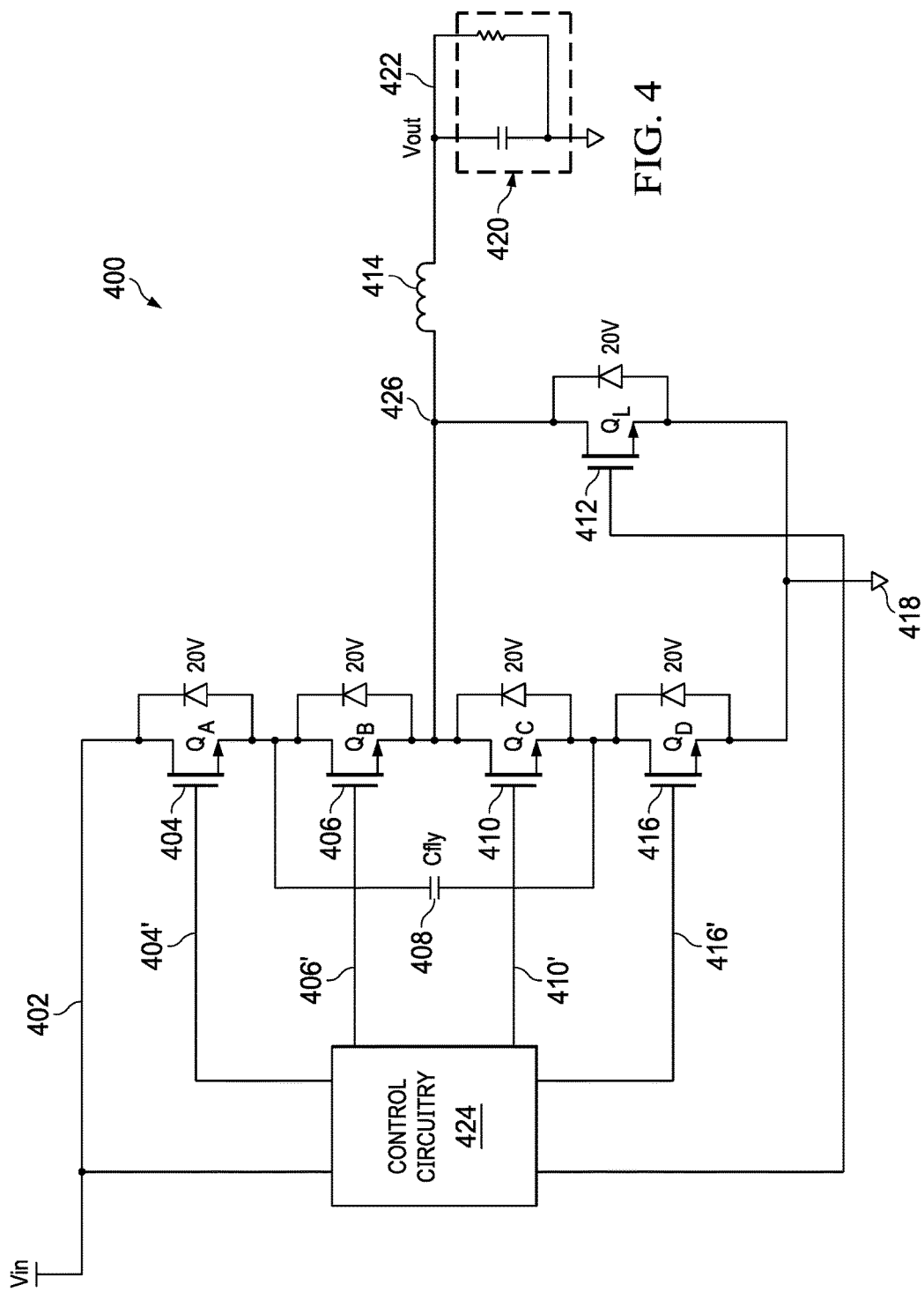
FIG. 4 schematically shows an example DC-DC converter.

FIG. 4 schematically shows an example DC-DC converter 400. Operated as described with respect to, e.g., FIG. 5A through FIG. 8, the converter 400 enables efficient response to high voltage transients, while enabling use of switches (transistors) that are rated for maximum voltages of normal operation, rather than maximum voltages of load dump (high voltage transient) operation.

As shown in FIG. 4, the converter 400 comprises an input voltage Vin 402 connected to the drain of a first transistor $Q_A$ 404. (Vin 402 is referred to herein as the input voltage; Vin 402 can also be viewed as a node configured to receive the input voltage.) The source of $Q_A$ 404 is connected to the drain of a second transistor $Q_B$ 406 and to the top plate of a flying capacitor 408. The source of $Q_B$ 406 is connected to the drain of a third transistor $Q_C$ 410, the drain of a fourth transistor $Q_L$ 412, and a first (input) terminal of an inductor 414. The source of $Q_C$ 410 is connected to the drain of a fifth transistor $Q_D$ 416 and the bottom plate of the flying capacitor 408. The source of $Q_D$ 416 is connected to the source of $Q_L$ 412 and to a ground GND 418. (GND 418 is referred to herein as the ground and as the ground voltage; GND 418 can also be viewed as a node configured to connected to ground.) A second (output) terminal of the inductor 414 is connected to an impedance 420 (here, a capacitor and a resistor in parallel). The impedance 420 is also connected to GND 418. The impedance (capacitor) 420 with the inductor 414 form a low pass filter to extract the DC value of the switching waveform, thereby completing the voltage down-conversion of Vin to Vout. Thus, the voltage at the second (output) terminal of the inductor 414, and across impedance 420, is an output voltage Vout 422 of the converter 400. The gates of $Q_A$ 404, $Q_B$ 406, $Q_C$ 410, $Q_L$ 412 and $Q_D$ 416 are respectively biased by control signals 404', 406', 410', 412' and 416'.

Preferably, transition from normal operation to load dump operation, or vice versa, is automatically performed by a control circuitry 424 by changing the timings of control signals 404', 406', 410', 412' and 416' provided by the control circuitry 424 to, respectively, $Q_A$ 404, $Q_B$ 406, $Q_C$ 410, $Q_L$ 412 and $Q_D$ 416. Control circuitry 424 preferably automatically detects when the input voltage Vin 402 exceeds a threshold for transition from normal operation to load dump operation, and when Vin 402 falls below a threshold for transition from load dump operation to normal operation.

Figure 5A:
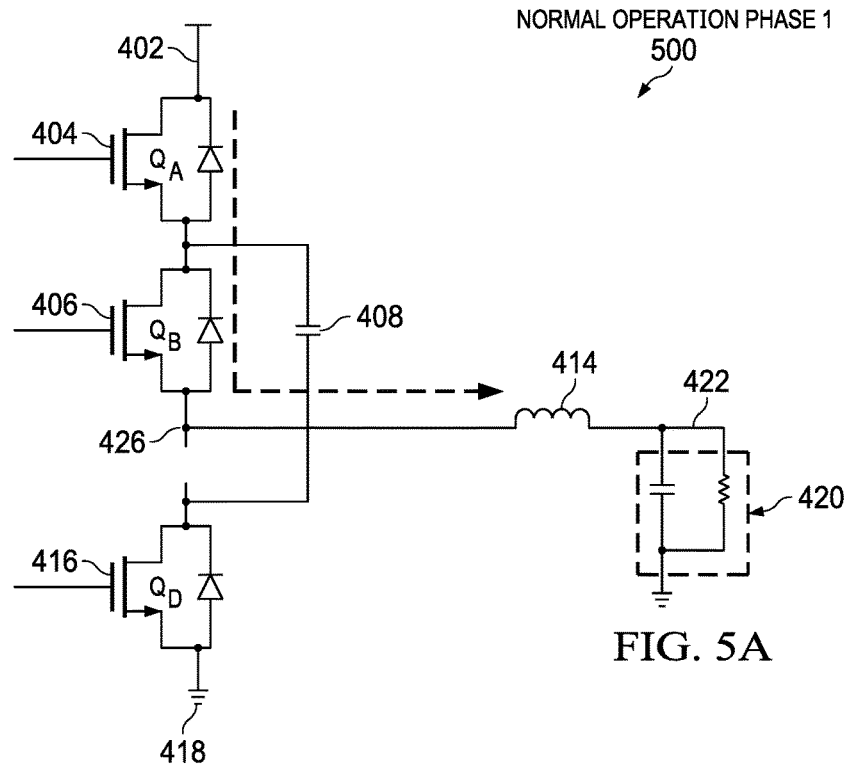
FIG. 5A schematically shows an example DC-DC converter in normal operation in a first of two switching levels.
Figure 5B:
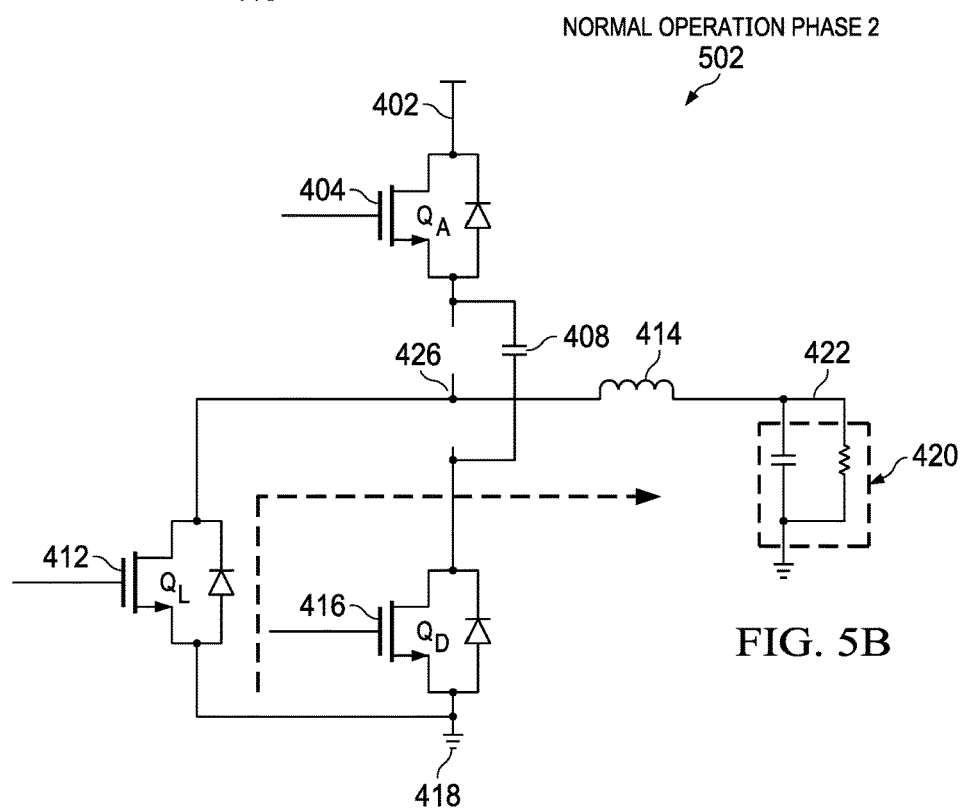
FIG. 5B schematically shows an example DC-DC converter in normal operation in a second of two switching levels.

As further described hereinbelow, FIGS. 5A and 5B show transistor activation patterns and current paths using the converter 400 to implement a normal operation mode with two switching levels (two phases). In the first phase, Vin 402 (and not GND 418) is connected to the input-side terminal of the inductor 414. In the second phase, GND 418 (and not Vin 402) is connected to the input-side terminal of the inductor 414. The two phases are alternated (1, 2, 1, 2, etc.). The converter's 400 normal operation mode thus mimics the behavior of the buck converter 300 shown in FIG. 3.

Figure 5C:
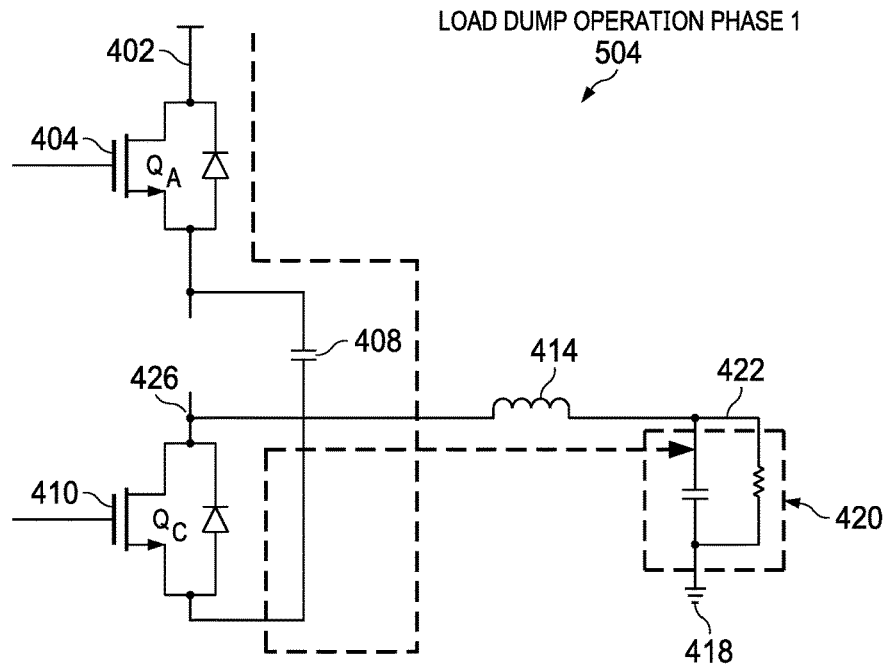
FIG. 5C schematically shows an example DC-DC converter in load dump operation in a first of three switching levels.
Figure 5D:
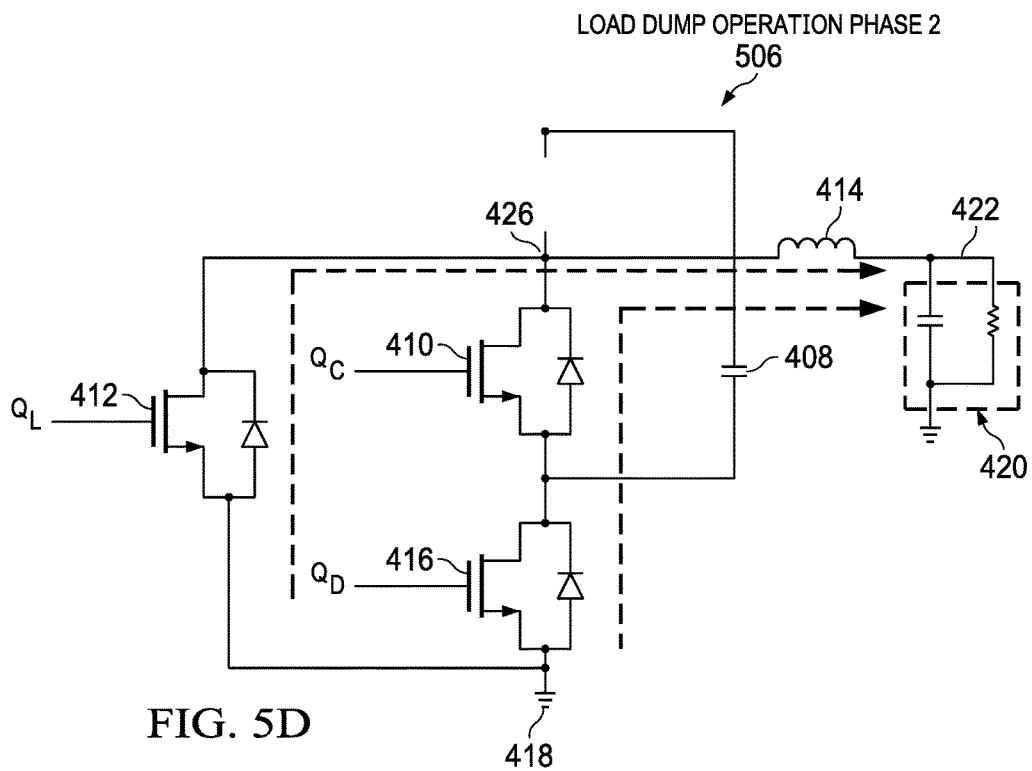
FIG. 5D schematically shows an example DC-DC converter in load dump operation in a second of three switching levels.
Figure 5E:
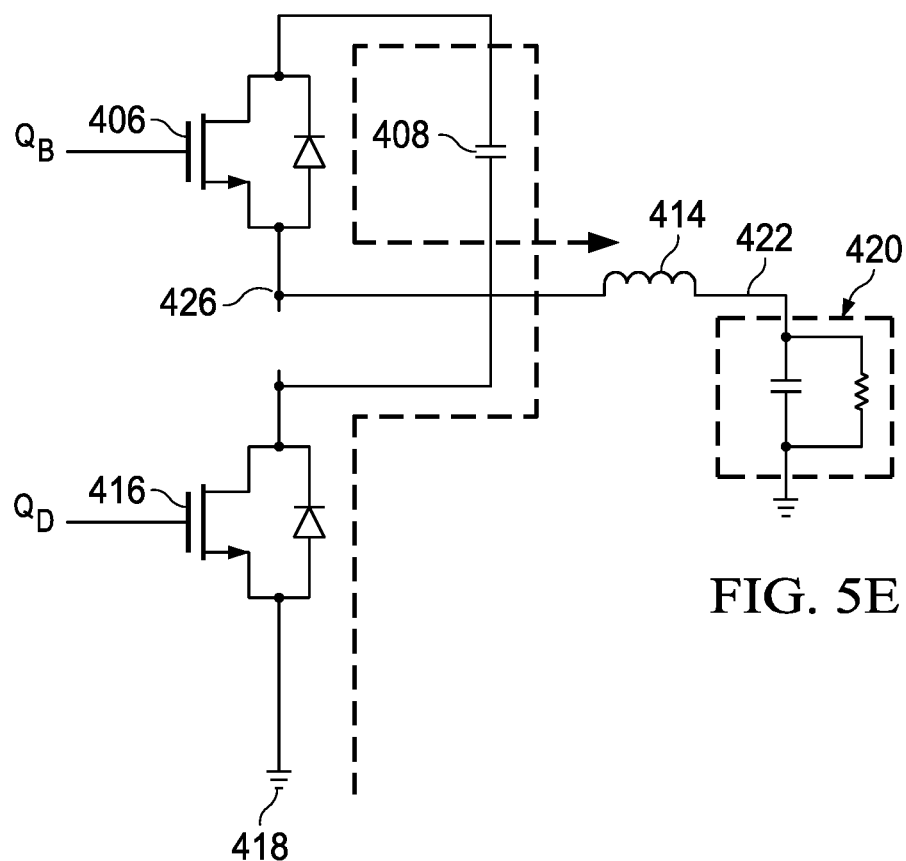
FIG. 5E schematically shows an example DC-DC converter in load dump operation in a third of three switching levels.

As further described hereinbelow, FIGS. 5C, 5D and 5E show transistor activation patterns and current paths using the converter 400 to implement a load dump operation mode with three switching levels (three phases). In the first phase, Vin 402 is connected through the flying capacitor 408 to the input-side terminal of the inductor 414 to charge the flying capacitor 408 while delivering power through the inductor 414. In the second phase, the flying capacitor 408 is in open loop (unless the voltage across the flying capacitor is too low, as further described with respect to FIG. 14), and the input-side terminal of the inductor 414 is connected to GND 418 instead of Vin 402. This results in a negative voltage across the inductor, which enables satisfaction of the zero voltage condition, which is further described with respect to FIG. 5E. In the third phase, the top plate of the flying capacitor 408 is connected to the input-side terminal of the inductor 414 to discharge the flying capacitor 408, and thereby deliver power, through the inductor 414. The phases repeat in a rising and falling pattern (1, 2, 3, 2, 1, 2, 3, 2, etc.).

Preferably, during three level load dump operation, at least one of $Q_C$ 410 and $Q_D$ 416 is on, so that a node SW 426 at the input terminal of the inductor 414 is clamped to $$\frac{Vin}{2}$$

in case of negative current through the inductor (current from Vout 422 to SW 426).

$Q_L$ 412 is used in addition to $Q_C$ 410 and $Q_D$ 416 to pull SW 426 more strongly (better connect) to ground GND 418 during the second phase of three level load dump operation ($Q_L$412 is coupled between SW 426 and GND 418 in parallel with $Q_C$ 410 and $Q_D$ 416). Use of $Q_L$ 412 thus enables use of transistors for $Q_C$ 410 and $Q_D$ 416 that use less device area.

For DC-DC power converters, multiple mode design of a two-level normal operation mode and a multi-level load dump operation mode can be applied to a variety of converter types, such as buck, boost, buck-boost, boost-buck and full bridge, including both isolated and non-isolated DC-DC converters.

FIG. 5A schematically shows an example of the DC-DC converter 400 (FIG. 4) in normal operation in a first of two switching levels 500. As shown in FIG. 5A, $Q_A$ 404, $Q_B$ 406 and $Q_D$ 416 are on, and $Q_C$ 410 and $Q_L$ 412 are off (Transistors from FIG. 4 that are off are present, but not shown in FIGS. 5A, 5B, 5C, 5D and 5E; current paths are indicated by a dotted line, with an arrow showing the direction of current flow.) Vin 402 is connected to the inductor 414 so that current flows from Vin 402, through the inductor 414 and through the impedance 420. Vin 402 is also connected to the top plate of the flying capacitor 408, and the bottom plate of the flying capacitor 408 is connected to GND 418. In this state, the converter 400 behaves like a buck converter 300 when the first transistor 304 is on, as described with respect to FIG. 3.

FIG. 5B schematically shows an example of the DC-DC converter 400 in normal operation in a second of two switching levels 502. As shown in FIG. 5B, $Q_A$ 404, $Q_L$ 412 and $Q_D$ 416 are on, and $Q_B$ 406 and $Q_C$ 410 are off. The inductor 414 is connected to GND 418 through $Q_L$ 412, so that inductive current flows from GND 418, across the inductor 414, and through the impedance 420. Vin 402 is connected to the top plate of the flying capacitor 408, and the bottom plate of the flying capacitor 408 is connected to GND 418. In this state, the converter 400 behaves like a buck converter 300 when the second transistor 306 is on, as described with respect to FIG. 3.

Preferably, in normal operation, the converter 400 switches between the first and second switching levels described in FIGS. 5A and 5B in a repeating 1=>2=>1=>2 pattern which continues indefinitely. This means that in each cycle (1=>2), the converter 400 will go through one switching level in which the voltage across the inductor 414 is Vin–Vout (i.e., FIG. 5A), and one switching level in which the voltage across the inductor 414 is –Vout (i.e., FIG. 5B). Consequently, the switching duty cycle for the first switching level has the same solution as for the buck converter 300:

$$D = \frac{Vout}{Vin},$$

where D is the duty cycle of the first switching level (such as the duty cycle described herein for the first transistor 304 of the buck converter 300). The second switching level will therefore have a duty cycle of $$1 - \frac{Vout}{Vin}.$$

FIG. 5C schematically shows an example of the DC-DC converter 400 in load dump operation in a first of three switching levels 504 (a flying capacitor 408 charging phase). Usually, maximum input voltage in load dump operation is approximately double the maximum input voltage in normal operation (described hereinabove with respect to FIG. 1B).

As shown in FIG. 5C, $Q_A$ 404 and $Q_C$ 410 are on, and $Q_B$ 406, $Q_L$ 412 and $Q_D$ 416 are off. GND 418 is disconnected on the input side of the converter 400. Vin 402 is connected to the top plate of the flying capacitor 408, and the bottom plate of the flying capacitor 408 is connected through $Q_C$ 410 to the inductor 414. Current therefore flows from Vin 402, through the flying capacitor 408, and from there through the inductor 414 and the impedance 420.

In this state, the flying capacitor 408 is charged by the input voltage (Vin 402) to $$\frac{Vin}{2} + \Delta.$$

Preferably, $\Delta$ is selected (and is small) so that, in the third load dump switching level (FIG. 5E), the flying capacitor 408 can discharge to provide current through the inductor 414.

Voltage across the flying capacitor 408 during normal operation is Vin, and voltage across the flying capacitor 408 during load dump operation is approximately $$\frac{Vin}{2}$$

Figure 14:
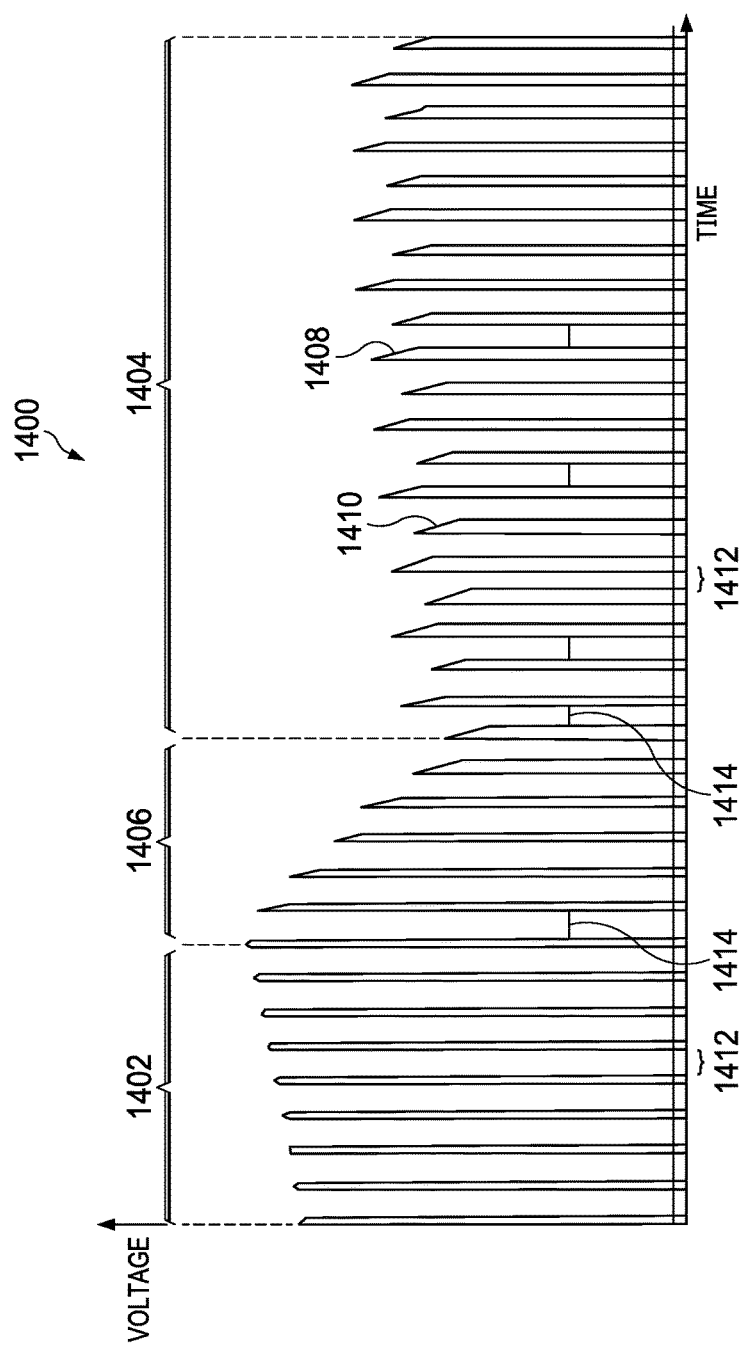
FIG. 14 shows an example graph of voltage versus time of a circuit for auxiliary charging of the flying capacitor when the flying capacitor's 408 voltage is too low during a multilevel converter operation mode.

("approximately" due to charging and discharging of the flying capacitor 408 during load dump operation). Voltage of the flying capacitor 408 transitions from Vin to $$\frac{Vin}{2}$$

during entry of the converter 400 from normal operation mode to load dump operation mode, which is further described hereinbelow (e.g., with respect to FIGS. 5D, 5E and 15). Voltage of the flying capacitor 408 transitions from $$\frac{Vin}{2}$$

back to Vin during exit of the converter 400 from load dump operation mode back into normal operation mode, which is further described hereinbelow (e.g., with respect to FIGS. 5E, 13A, 13B, and 15). During load dump operation, voltage of the flying capacitor 408 is maintained at $$\frac{Vin}{2}$$

by the flying capacitor 408 charging phase (FIG. 5C) and discharging phase (FIG. 5E) of the three level switching mode, and by an auxiliary charging circuit (FIG. 14).

In FIG. 5C, the voltage on the input side of the inductor 414 is Vin minus the voltage across the flying capacitor 408, which is approximately $$Vin - \frac{Vin}{2} = \frac{Vin}{2}.$$

Therefore, the voltage across the inductor 414 in this state is $$\frac{Vin}{2} - Vout.$$

Because the voltage across the inductor 414 is positive, current increases and power (I*V) delivered across the inductor 414 increases.

The capacitance of the flying capacitor 408 is selected for a voltage of $$\frac{Vin}{2}$$

to exist across the flying capacitor 408 during three level (load dump) operation.

$$\frac{Vin}{2}$$

is used so that transistors in the converter 400 can be rated for 20 volts (i.e., normal operation voltage levels), and to limit size and cost of the flying capacitor 408 (higher-rated capacitors are generally larger and more expensive to produce). Other capacitances may be selected, and other shunt block configurations may be used, such that the flying capacitor 408 will carry a higher or lower fraction of the input voltage.

FIG. 5D schematically shows an example of the DC-DC converter 400 in load dump operation in a second of three switching levels 506 (an inductor 414 input terminal grounding phase). As shown in FIG. 5D, $Q_C$ 410, $Q_L$ 412 and $Q_D$ 416 are on, and $Q_A$ 404 and $Q_B$ 406 are off. Vin 402 is disconnected, and the flying capacitor 408 "floats"—the flying capacitor's 408 top plate is not connected to Vin 402 or to the inductor 414, and therefore it neither charges nor discharges. GND 418 is connected to the inductor 414, so that inductive current flows from GND 418 across the inductor 414 and through the impedance 420. Here, the voltage on the input side of the inductor 414 is zero, and the voltage across the inductor 414 equals −Vout. Because voltage across the inductor 414 is negative, current decreases and power (I*V) delivered across the inductor 414 decreases.

FIG. 5E schematically shows an example of the DC-DC converter 400 in load dump operation in a third of three switching levels 508 (a flying capacitor 408 discharging phase). As shown in FIG. 5E, $Q_B$ 406 and $Q_D$ 416 are on, and $Q_A$ 404, $Q_C$ 410 and $Q_L$ 412 are off. Vin 402 is open loop from the rest of the circuit. GND 418 is connected to the bottom plate of the flying capacitor 408, and the top plate of the flying capacitor 408 is connected to the inductor 414. The capacitor therefore discharges, via $Q_B$ 406, through the inductor 414 and the impedance 420. Inductive current, and current from the flying capacitor 408 discharging, flow through the inductor 414. Here, the voltage on the input side of the inductor 414 is the voltage across the flying capacitor, i.e., approximately $$\frac{Vin}{2}.$$

The voltage across the inductor 414 in this state is therefore $$\frac{Vin}{2} - Vout.$$

Because voltage across the inductor 414 is positive, current increases and power (I*V) delivered across the inductor 414 increases.

Preferably, in load dump operation, the converter 400 switches between the first, second and third switching levels described in FIGS. 5C, 5D and 5E in a 1=>2=>3=>2=>1=>2=>3=>2 pattern, repeated indefinitely during load dump operation. Consequently, in each cycle (1=>2=>3=>2), the converter 400 will go through two switching levels in which the voltage across the inductor 414 is $$\frac{Vin}{2} - Vout,$$

and two switching levels in which the voltage across the inductor 414 is −Vout. This enables the zero voltage condition to be satisfied given the correct duty cycles for the different switching levels, as described hereinbelow.

Charge time for the flying capacitor 408 equals discharge time for the flying capacitor 408 because charge current equals discharge current (charge energy equals discharge energy). This means that the time spent in the first switching level will equal the time spent in the third switching level. If D is used to describe the duty cycle of the first and third switching levels together, then each of the first and third switching levels will have a duty cycle of D/2. Therefore, to satisfy the zero voltage condition:

$$D*\left(\frac{Vin}{2} - Vout\right) + (1-D)(-Vout) = 0 \qquad \text{Eq. 1}$$

Solving Eq. 1 gives $$D = \frac{2*Vout}{Vin},$$

so each of the first and third switching levels will have a duty cycle of $$\frac{Vout}{Vin},$$

and the second switching level will have a duty cycle of $$1 - \frac{2*Vout}{Vin}.$$

Entry of the converter 400 from the normal operation two level switching scheme into the load dump operation three level switching scheme is preferably accomplished by continuing to provide power through the inductor 414 while switching between the second and third switching levels of the three level switching mode (in a 2=>3=>2=>3 pattern). Switching between the flying capacitor 408 being in open loop (i.e., second switching level), and the flying capacitor 408 discharging (i.e., third switching level), gradually discharges the flying capacitor 408 from Vin, which is the voltage across the flying capacitor 408 during normal operation, to $$\frac{Vin}{2},$$

which is the voltage across the flying capacitor 408 during load dump operation. Alternating between the second and third switching levels enables maintaining the zero voltage condition during the transition, because voltage across the inductor 414 will vary between $$\frac{Vin}{2} - Vout,$$

and −Vout. Entry of the converter 400 from normal operation into load dump operation is further described with respect to FIGS. 5D and 5E in Section III.

Exit of the converter 400 from the three level load dump operation switching scheme back to the two level normal operation switching scheme is preferably accomplished by continuing to provide power through the inductor 414, and using an auxiliary circuit (FIGS. 13A and 13B) to charge the flying capacitor 408 from $$\frac{Vin}{2},$$

which is the voltage across the flying capacitor 408 during load dump operation, to Vin, which is the voltage across the flying capacitor 408 during normal operation. This exit is preferably not done by switching between the third (discharging) and second (grounding) switching levels, because the input terminal of the inductor 414 would potentially have insufficient voltage to maintain the zero voltage condition and continue to transfer power through the inductor 414 during the transition. Exit of the converter 400 from load dump operation back into normal operation is further described with respect to FIGS. 13A and 13B.

A figure of merit (FOM) is a measure of the performance of a device. Because the converter 400 uses the same transistors in normal operation and load dump operation, and limits the voltage across those transistors to normal operation levels during both normal and load dump operation modes, the multi-level converter 400 is able to use transistors rated for the relatively low voltages of normal operation. Because lower-voltage-rated transistors generally have better FOMs than higher-voltage-rated transistors, this enables the converter 400 to use transistors with significantly better FOMs. For example, lower voltage rated transistors can have some or all of lower QG (gate charge), RDS (drain-source on resistance), $Q_{OSS}$ (amount of charge to charge drain-source capacitance), and $R_{SP}$ (RDS*total FET layout area, such as 40% as high in a 20 volt device as in a 40 volt device). Therefore, because the converter 400 can use transistors rated for voltages of normal operation, the converter 400 will generally be significantly more efficient—it will have lower conduction and switching losses—than a converter using transistors rated for voltages of load dump operation.

Figure 6A:
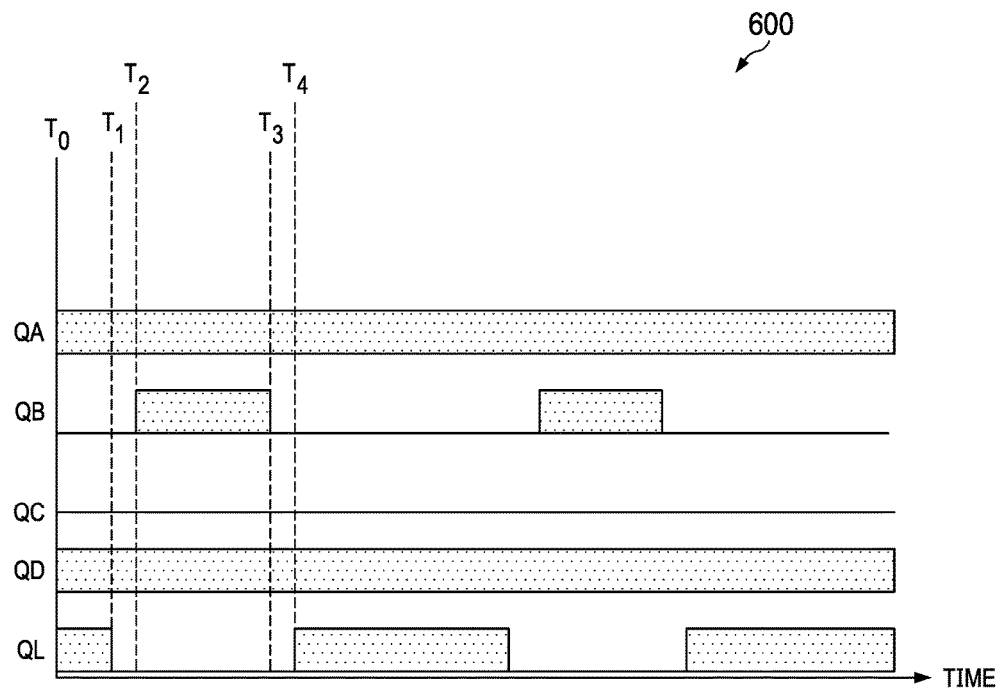
FIG. 6A shows an example timing diagram for a DC-DC converter in a normal operation two switching level mode.

FIG. 6A shows an example timing diagram 600 for the DC-DC converter 400 in a normal operation two switching level mode. During normal operation, such as when voltage is between 8 and 16 volts (generally, under 20 volts), the converter 400 is preferably controlled using a two level switching scheme during which the flying capacitor 408 is not involved in providing current to the inductor 414.

Figure 6B:
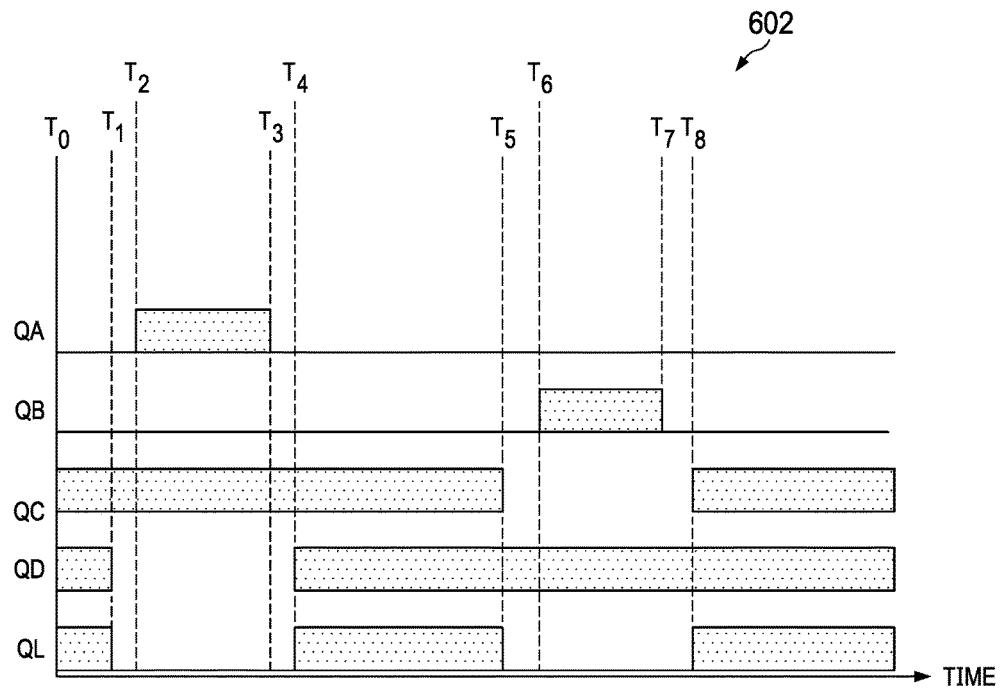
FIG. 6B shows an example timing diagram for a DC-DC converter in a load dump operation three switching level mode.

FIGS. 6A and 6B show signal timings, corresponding to control signals 404', 406', 410', 412' and 416'. FIGS. 6A and 6B are described with respect to activation states of respective corresponding transistors $Q_A$ 404, $Q_B$ 406, $Q_C$ 410, $Q_L$ 412 and $Q_D$ 416.

As shown in FIG. 6A, after converter 400 startup (such as during an automobile turn-on process), $Q_A$ 404 and $Q_D$ 416 are always on and $Q_C$ 410 is always off. From time $T_0$ to time $T_1$, $Q_L$ 412 is on and $Q_B$ 406 is off (FIG. 5B), so that the inductor 414 is connected to GND 418, similarly to the second transistor 306 on state of the converter 300 of FIG. 3. From time $T_1$ to time $T_2$, $Q_B$ 406 and $Q_L$ 412 are off, avoiding a short from Vin to GND 418, as described with respect to FIG. 3. From time $T_2$ to time $T_3$, $Q_B$ 406 is on and $Q_L$ 412 is off (FIG. 5A), so that the inductor 414 is connected to Vin 402, similarly to the first transistor 304 on state of the converter 300 of FIG. 3. From time $T_3$ to time $T_4$, $Q_B$ 406 and $Q_L$ 412 are off. After $T_4$, the converter 400 returns to the same point in the cycle as described with respect to $T_0$ to time $T_1$, i.e., the two level switching cycle repeats from time $T_0$.

FIG. 6B shows an example timing diagram 602 for the DC-DC converter 400 in a load dump operation three switching level mode. During load dump operation, such as when voltage is between 20 and 40 volts, the converter 400 is preferably controlled using a three level switching scheme.

As shown in FIG. 6B, between times $T_0$ and $T_1$, the converter 400 is in the second of the three switching levels. $Q_C$ 410, $Q_L$ 412 and $Q_D$ 416 are on, and $Q_A$ 404 and $Q_B$ 406 are off, so that the top plate of the flying capacitor 408 is disconnected, and inductive current flows from the input-side GND 418 through the inductor 414, as described with respect to FIG. 5D.

Figure 3:
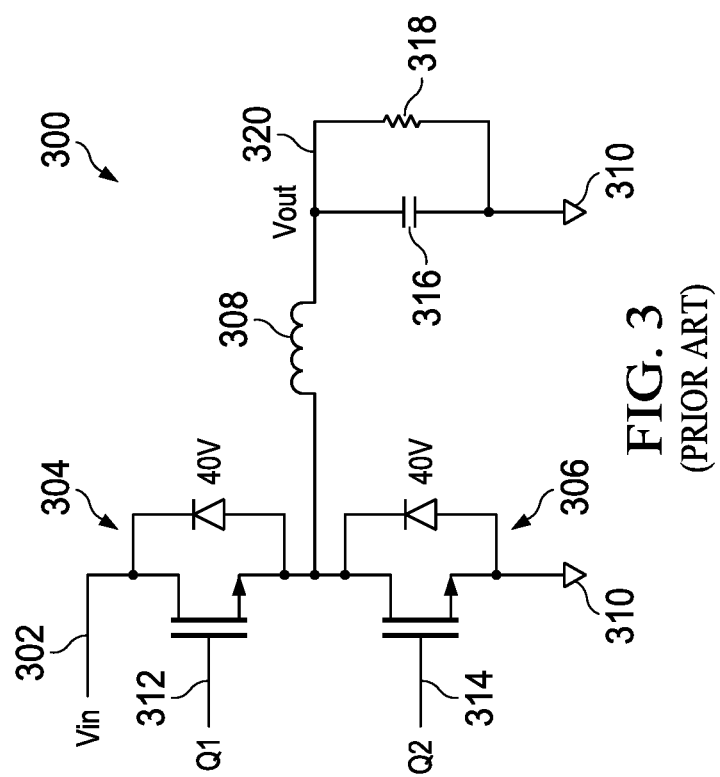
FIG. 3 schematically shows an example buck converter.

Between times $T_1$ and $T_2$, the converter 400 is in a "dead" period used to avoid shorting Vin 402 to GND 418 (as described with respect to FIG. 3). $Q_C$ 410 remains on (maintaining clamping of SW 426 to $$\frac{Vin}{2},$$

as described with respect to FIG. 4) and $Q_A$ 404, $Q_B$ 406, $Q_L$ 412 and $Q_D$ 416 are off, so that no path exists from Vin 402 or GND 418 for current to flow through the inductor 414.

Between times $T_2$ and $T_3$, the converter 400 is in the first of the three switching levels. $Q_A$ 404 and $Q_C$ 410 are on, and $Q_B$ 406, $Q_L$ 412 and $Q_D$ 416 are off, so that current flows from Vin 402, through the flying capacitor 408 (charging the flying capacitor 408), and thence through the inductor 414, as described with respect to FIG. 5C.

Between times $T_3$ and $T_4$, the converter 400 is in a dead period. Between times $T_4$ and $T_5$, the converter 400 is again in the second of the three switching levels. Between times $T_5$ and $T_6$, the converter 400 is in a dead period.

Between times $T_6$ and $T_7$, the converter 400 is in the third of the three switching levels. $Q_B$ 406 and $Q_D$ 416 are on, and $Q_A$ 404, $Q_C$ 410 and $Q_L$ 412 are off, so that current flows from GND 418, through the flying capacitor 408, and thence through the inductor 414. Current during this period includes discharge from the flying capacitor 408, as described with respect to FIG. 5E.

Between times $T_7$ and $T_8$, the converter 400 is in a dead period. After $T_8$, the converter 400 returns to the same point in the cycle as described with respect to $T_0$ to $T_1$, i.e., the three level switching cycle repeats from time $T_0$.

FIG. 7 shows an example graph of voltage over time 700 for the DC-DC converter 400. Between times $T_0$ and $T_1$, the converter 400 is in normal operation, in which input voltage Vin 402 is under a voltage limit for normal operation, e.g., 20 volts. At time $T_1$, Vin 402 exceeds the voltage limit for normal operation (i.e., rises above a normal operation threshold). Between times $T_1$ and $T_2$, Vin 402 continues to rise and the system prepares for load dump operation (i.e., high voltage operation), so the converter 400 transitions from normal operation to load dump operation by providing power through the inductor 414 while discharging the flying capacitor 408 from Vin to $$\frac{Vin}{2}$$

(generally, 20 volts or less, i.e., within the normal operation input voltage range), as described with respect to FIGS. 5D, 5E and 15 (described hereinbelow in Section III). The converter 400 enters load dump operation when the voltage across the flying capacitor 408 equals $$\frac{Vin}{2}.$$

Between times $T_2$ and $T_3$, the converter 400 is in load dump operation, as described with respect to FIGS. 5C, 5D, 5E and 6B, in which Vin 402 is up to twice the normal operation voltage limit. For example, if the normal operation threshold is 20 volts, then Vin 402 can reach 40 volts during load dump operation. At time $T_3$, input voltage falls beneath a threshold for return to normal operation (i.e., falls below a high voltage operation threshold). Between times $T_3$ and $T_4$, the flying capacitor 408 is charged to Vin as described with respect to FIGS. 5E, 13A, 13B, and 15. After time $T_4$, the converter 400 remains in normal operation as described with respect to FIGS. 5A and 5B.

Figure 8:
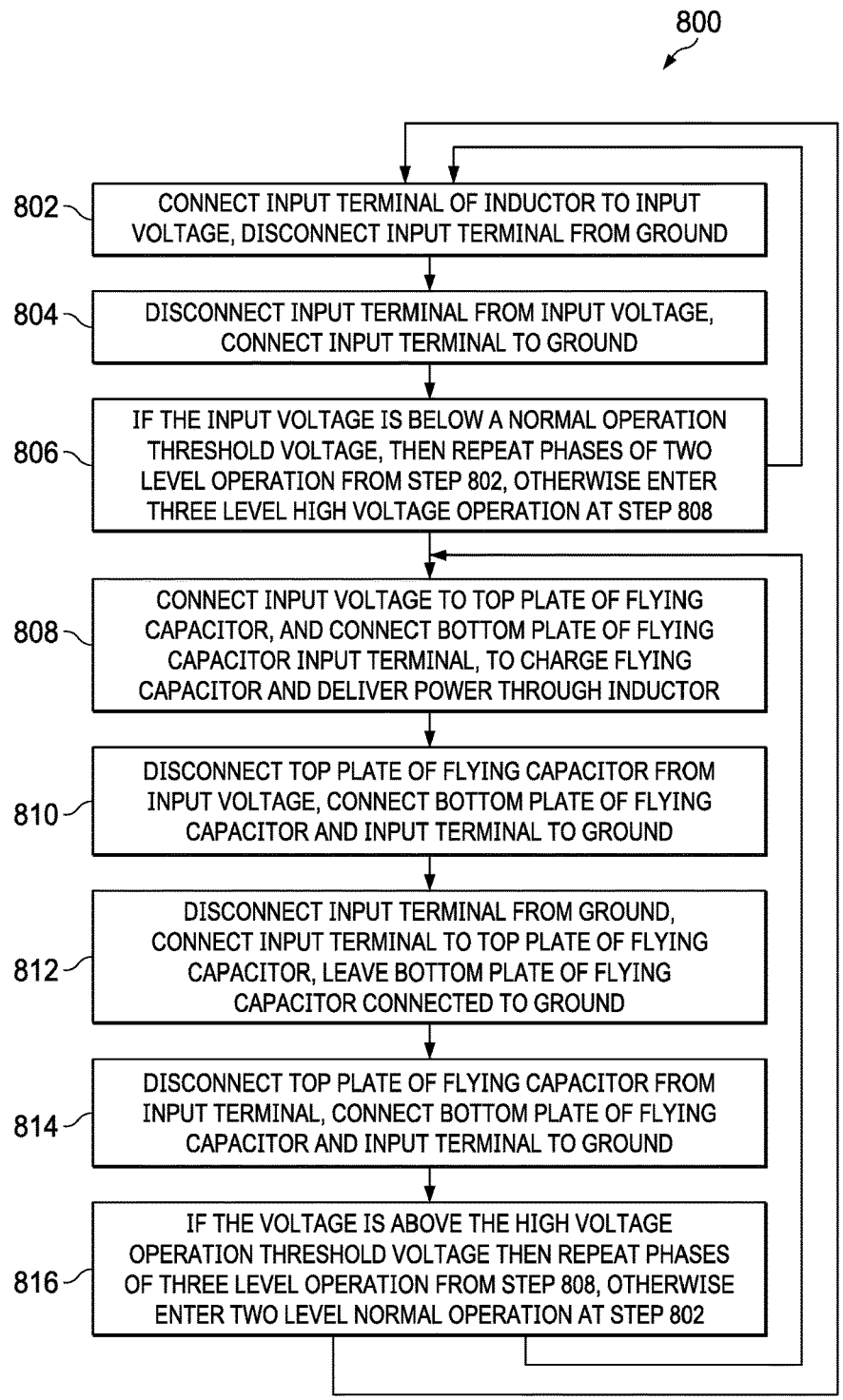
FIG. 8 shows an example process for operating a DC-DC converter.
Figure 13A:
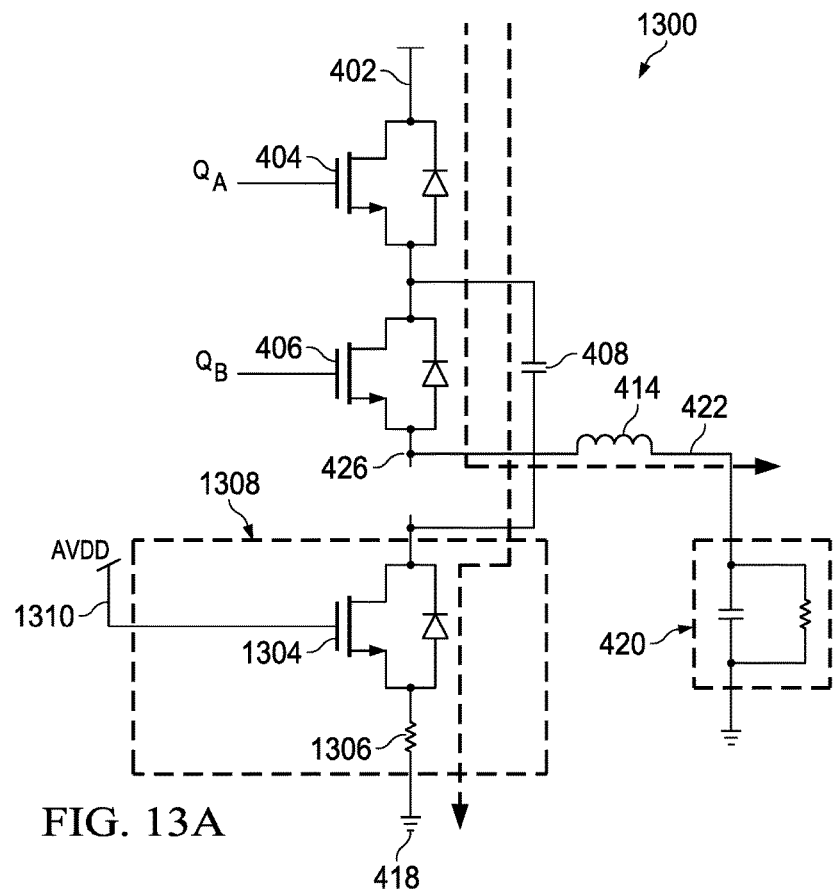
FIG. 13A schematically shows an example DC-DC converter transitioning from load dump operation to normal operation, in a first of two switching levels.
Figure 13B:
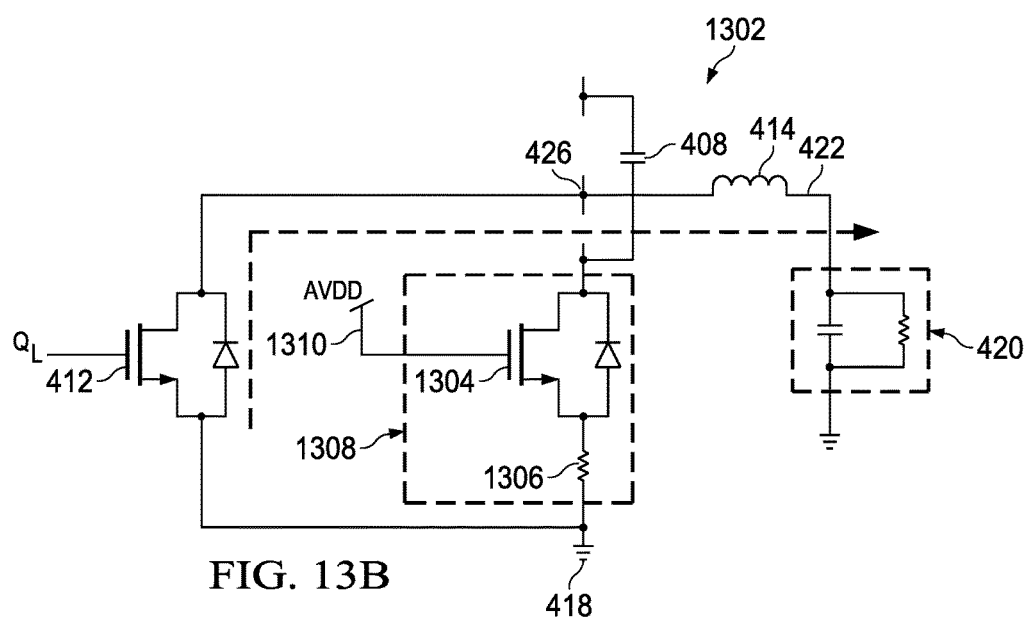
FIG. 13B schematically shows an example DC-DC converter transitioning from load dump operation to normal operation, in a second of two switching levels.

FIG. 8 shows an example process for operating a DC-DC converter 800. As shown in FIG. 8, a two level power provision cycle begins with the converter connecting an input terminal of the inductor to the input voltage and disconnecting the input terminal of the inductor from ground in step 802 (FIG. 5A). The converter then disconnects the input terminal of the inductor from the input voltage and connects the input terminal of the inductor to ground in step 804 (FIG. 5B). If the input voltage is below a normal operation threshold voltage, the converter repeats the two level normal power provision cycle from step 802, otherwise the converter enters high input voltage operation and transitions to a three level high input voltage power provision cycle beginning at step 808, in step 806 (FIGS. 5D and 5E as described in Section III). The three level power provision cycle begins with connecting the input voltage to the top plate of a flying capacitor and connecting the bottom plate of the flying capacitor to the input terminal of the inductor in step 808 (FIG. 5C). The top plate of the flying capacitor is then disconnected from the input voltage, and the bottom plate of the flying capacitor and the input terminal of the inductor are connected to ground in step 810 (FIG. 5D). The input terminal of the inductor is then disconnected from ground and connected to the top plate of the flying capacitor, and the bottom plate of the flying capacitor remains connected to ground, in step 812 (FIG. 5E). The input terminal of the inductor is then disconnected from the top plate of the flying capacitor and connected to ground in step 814 (FIG. 5D). (Step 814 is a return to the switch on/off configuration of step 810.) If the input voltage is above a high voltage operation threshold voltage, the converter repeats the three level power provision cycle from step 808, otherwise the converter enters normal operation and transitions to the two level power provision cycle beginning at step 802, in step 816 (FIGS. 13A and 13B).

Section II. Node Voltage Tracking and Control for Multi-Level Converters

Figure 9:
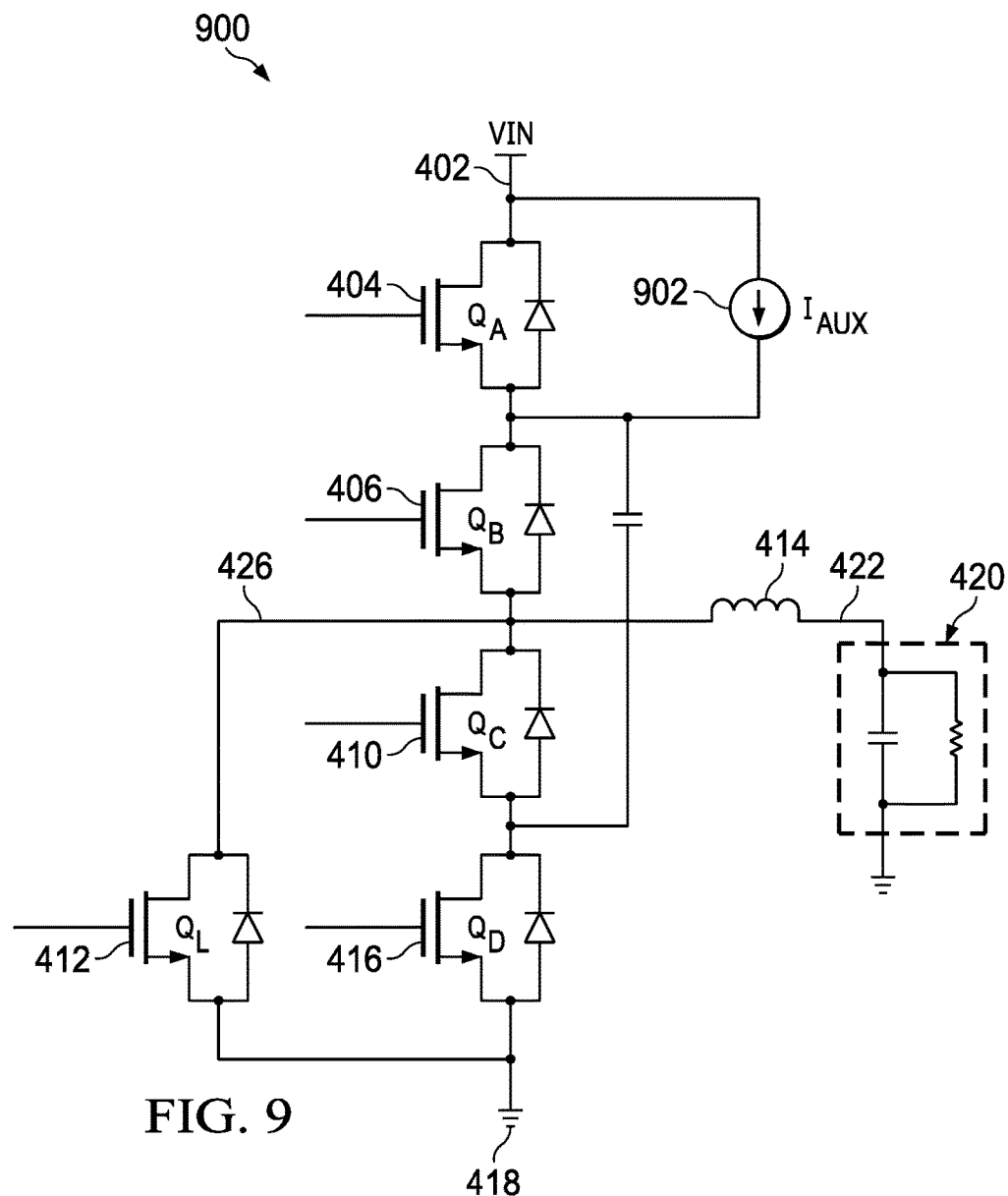
FIG. 9 schematically shows an example DC-DC converter, comprising a converter with an auxiliary current source $I_{AUX}$ with a controlled voltage for charging the flying capacitor.

FIG. 9 schematically shows an example DC-DC converter 900, comprising a converter 400 with an auxiliary current source $I_{AUX}$ 902 with a controlled current for charging the flying capacitor 408. The converter 900 is used as an example of multi-level converters. For DC-DC converters, an auxiliary current source (such as described with respect to FIGS. 9, 10 and 11) can be applied to charging of a flying capacitor in a variety of multi-level converter configurations and types, such as buck, boost, buck-boost, boost-buck and full bridge, including both isolated and non-isolated DC-DC converters.

Figure 10:
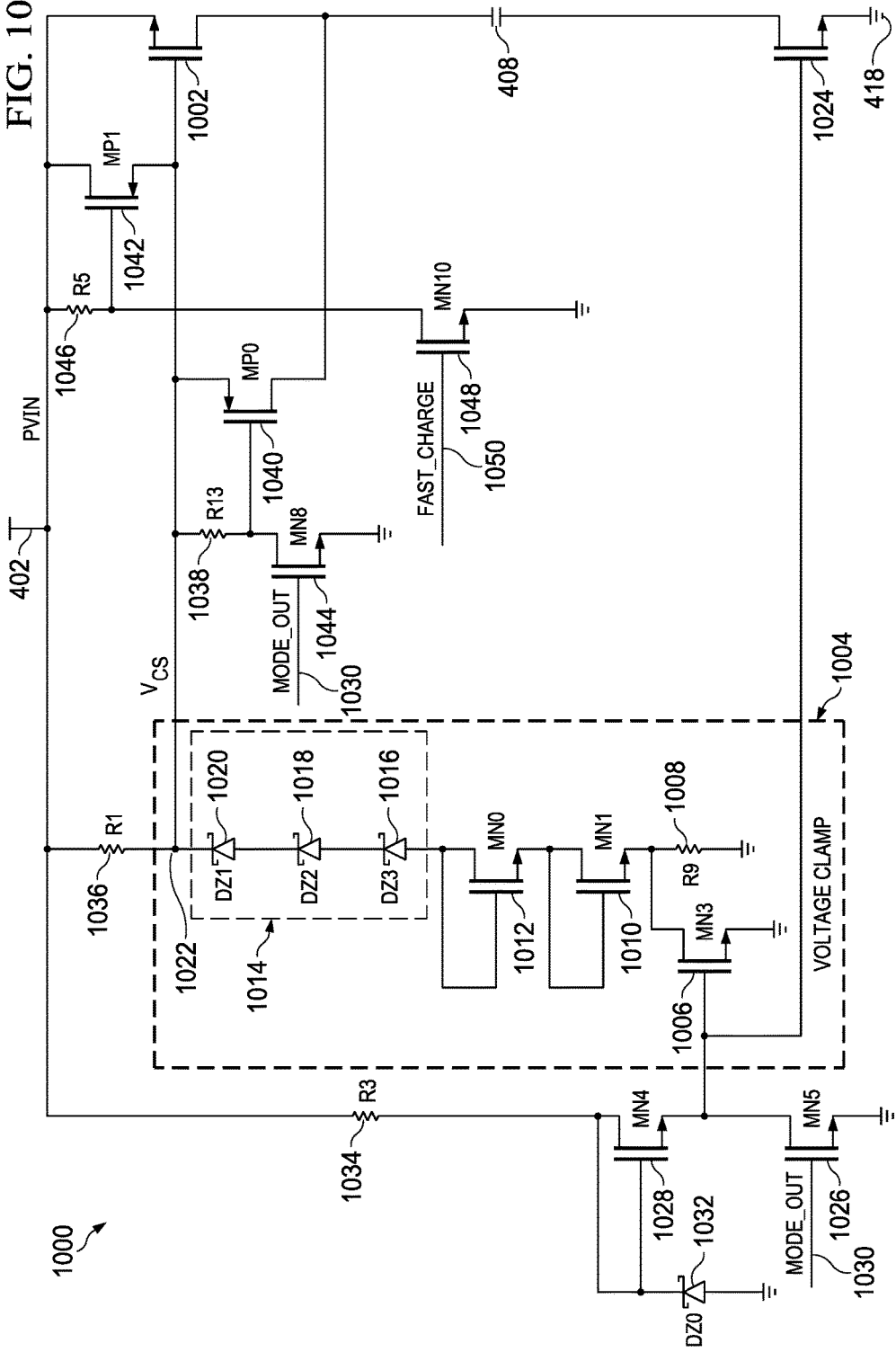
FIG. 10 schematically shows an example circuit for initially charging the flying capacitor before commencement of switching by the converter.
Figure 11:
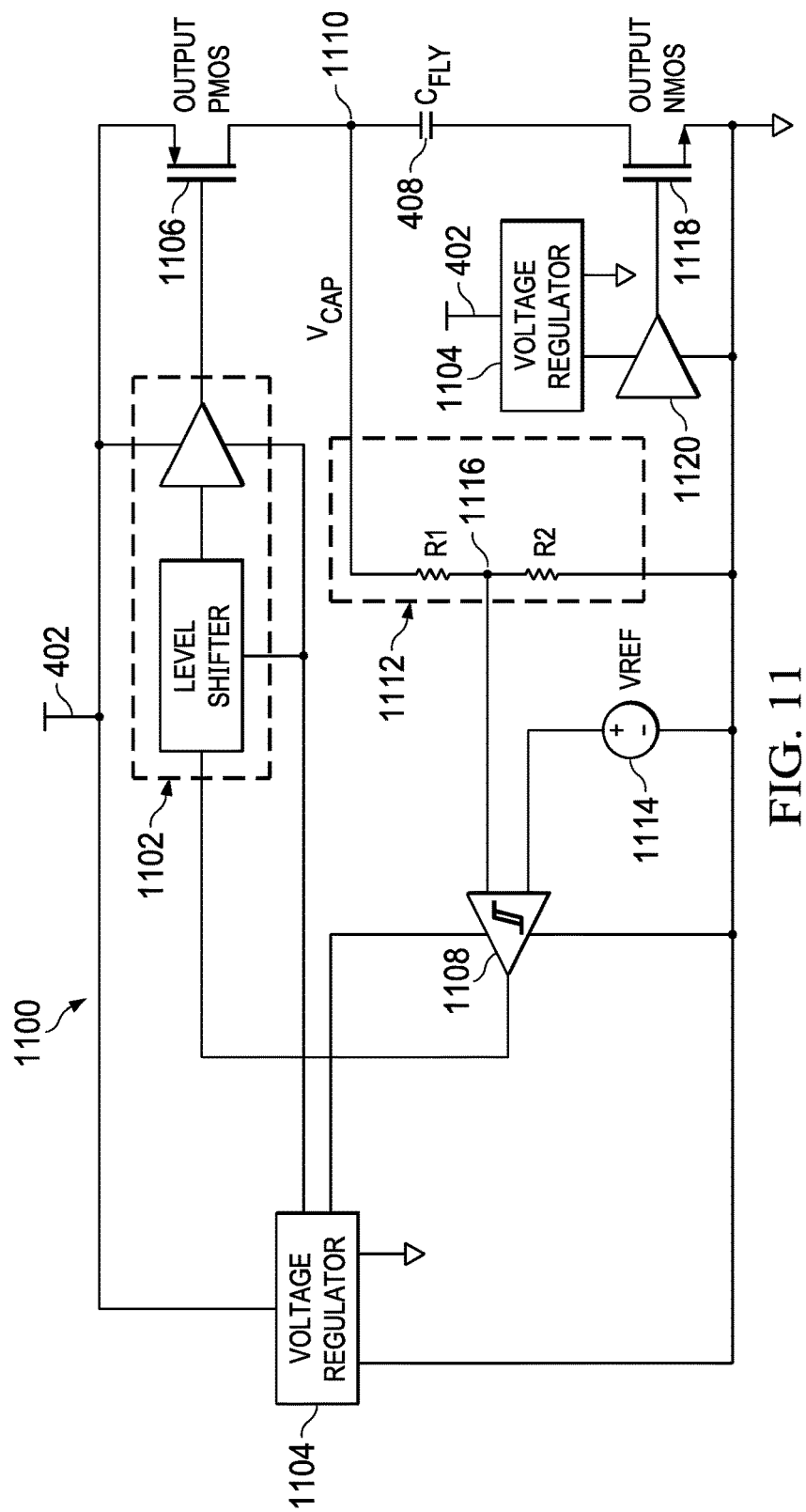
FIG. 11 schematically shows an example circuit for initially charging the flying capacitor before commencement of switching by the converter.

As shown in FIG. 9, $I_{AUX}$ 902 directs current flow from Vin 402 to the top plate of the flying capacitor 408. FIGS. 10 and 11 show examples of circuits that can be used as the auxiliary current source $I_{AUX}$ 902 (accordingly, either the circuit of FIG. 10 or the circuit of FIG. 11 can be used as the auxiliary current source $I_{AUX}$ 902).

If the flying capacitor 408 remains uncharged during converter startup until the converter 900 commences switching (begins power regulation), $Q_A$ 404 (the high side transistor) may be required to block a transient high Vin 402 (e.g., 40 V). Accordingly, $Q_A$ 404 may be required to be rated for the maximum transient high voltage reachable by Vin 402 during startup, sacrificing efficiency and device area.

By charging the flying capacitor 408 as further described hereinbelow (e.g., with respect to FIGS. 10 and 11), voltage can be distributed so that, when the converter 900 is not regulating, the input voltage Vin 402 equals the voltage of the flying capacitor 408 ($V_{CAP}$) plus the drain-source voltage ($V_{QA}$) of the high side transistor $Q_A$ 404. Accordingly, by charging the flying capacitor 408 during system startup, $Q_A$ 404 will not have to block Vin 402, and is instead enabled to block Vin–$V_{CAP}$, which can be limited to less than the breakdown voltage of $Q_A$ 404. $V_{CAP}$ is preferably less than the breakdown voltage ($BV_{DSS}$) of the transistors (switches) in the converter 900, but also high enough such that remaining voltage to be blocked by switches is less than $BV_{DSS}$. $V_{CAP}$ preferably charges such that it equals the lesser of Vin 402 and an upper limit voltage. The upper limit on $V_{CAP}$ is chosen, so that transistors will not be required to block their breakdown voltage (or more) when they are connected in parallel with the flying capacitor 408. For example, $Q_B$ 406 will generally see $V_{CAP}$. The bottom plate of the flying capacitor 408 should be coupled to GND 418 during startup. Voltage conditions for the flying capacitor 408 and $Q_A$ 404 (the high side transistor) is therefore described as follows:

$$Vin = V_{CAP} + V_{QA} \qquad \text{Eq. 2}$$

$$Vin - BV_{DSS} < V_{CAP} < BV_{DSS} \qquad \text{Eq. 3}$$

Preferably, the upper limit of $V_{CAP}$, and the breakdown voltage of $Q_A$ 404, equal one half of the maximum possible Vin 402. For example, if Vin 402 can reach 40 volts during a load dump event (or other high voltage transient), then the upper limit of $V_{CAP}$ and the breakdown voltage of $Q_A$ 404 are preferably 20 volts. (A safety factor can be added to the breakdown voltage to compensate for fluctuations in $V_{CAP}$; for example, the breakdown voltage of $Q_A$ 404 can be 21 volts.)

FIG. 10 schematically shows an example circuit 1000 for initially charging the flying capacitor 408 before commencement of switching by the converter 400. In embodiments as shown in FIG. 10, an NMOS transistor 1002 (which functions as a source following current source) has a source connected to the input voltage Vin 402, a drain connected to the top plate of the flying capacitor 408, and a gate biased by Vin 402, clamped to a rated bias voltage of the NMOS transistor 1002 (e.g., 20 volts) by a voltage clamp 1004. For example, the NMOS transistor 1002 can be implemented as $Q_A$ 404 (FIG. 4).

The voltage clamp 1004 preferably comprises: NMOS transistor MN3 1006, with source connected to GND 418 and drain connected to resistor R9 1008 (R9 1008 is also connected to GND 418) and source of NMOS transistor MN1 1010; gate and drain of MN1 1010 connected to source of NMOS transistor MN0 1012; gate and drain of MN0 1012 connected to a Zener diode stack 1014, comprising (in anode to cathode direction) Zener diodes DZ3 1016, DZ2 1018 and DZ1 1020 connected in series; the cathode of DZ1 1020 connected to a node $V_{CS}$ 1022 (NMOS transistor 1002 bias voltage).

The bottom plate of the flying capacitor 408 is connected to the drain of a ground switch 1024. The source of the ground switch 1024 is connected to GND 418. For example, the ground switch 1024 can be implemented as $Q_D$ 416 (FIG. 4).

The gate of the ground switch 1024 is connected to the gate of MN3 1006, the drain of an NMOS transistor MN5 1026, and the source of an NMOS transistor MN4 1028. The source of MN5 1026 is connected to GND 418, and the gate of MN5 1026 is connected to a MODE_OUT 1030 signal.

The gate of MN4 1028 is connected to the drain of MN4 1028 and to the cathode of a Zener diode DZ0 1032, the anode of which is connected to GND 418. The drain of MN4 1028 is also connected to a resistor R3 1034, which in turn is connected to Vin 402.

$V_{CS}$ 1022 is connected to: a resistor R1 1036, which in turn is connected to Vin 402; a resistor R13 1038; the source of PMOS transistor MP0 1040; the source of PMOS transistor MP1 1042; and the gate of the NMOS transistor 1002 (thus providing the clamped voltage from the voltage clamp 1004, as described hereinabove).

The drain of MP0 1040 is connected to the top plate of the flying capacitor 408 and to the drain of the NMOS transistor 1002. The gate of MP0 1040 is connected to R13 1038 and to the drain of NMOS transistor MN8 1044. The source of MN8 1044 is connected to GND 418. The gate of MN8 1044 is connected to MODE_OUT 1030.

The drain of MP1 is connected to Vin 402. The gate of MP1 1042 is connected to: resistor R5 1046, which in turn is connected to Vin 402; and to the drain of NMOS transistor MN10 1048. The source of MN10 1048 is connected to GND 418. The gate of MN10 1048 is connected to a Fast_Charge 1050 signal.

Preferably, during startup, the converter 900 will first connect the bottom plate of the flying capacitor 408 to GND 418 by turning on the ground switch 1024 (e.g., $Q_D$ 416 or part of $Q_D$ 416; in some embodiments, transistors in a converter 900 can be relatively large transistors divided into multiple segments). Then, $I_{AUX}$ 902 is activated by turning on the NMOS transistor 1002 (e.g., $Q_A$ 404 or part of $Q_A$ 404), and the flying capacitor 408 is charged. The voltage clamp 1004 and ground switch 1006 should be started (charged) early enough that they are ready to perform their respective functions when needed.

The voltage delivered by the NMOS transistor 1002 to the node to which the top plate of the flying capacitor 408 is connected will be the gate voltage of the NMOS transistor 1002 (the voltage delivered by the voltage clamp 1004) minus the threshold voltage ($V_{TH}$, typically small) of the NMOS transistor 1002. The voltage delivered by the voltage clamp 1004 is preferably one half of the maximum input voltage (load operation voltage) plus the threshold voltage of the NMOS transistor $$1002 \left( \frac{\text{Vin\_max}}{2} + V_{TH} \right).$$

For example, if Vin_max equals 40 volts, then the voltage delivered by the voltage clamp 1004 is preferably about 20 volts.

While Vin 402 is ramping during startup, the voltage delivered to the NMOS transistor 1002 will also ramp (up to 20 volts), as will the voltage of the flying capacitor 408. Voltage of the flying capacitor 408 will increase as I=C(dV/dt), where I is the current delivered from the NMOS transistor 1002 to the top plate of the flying capacitor 408, V is the voltage across the flying capacitor, and C is the capacitance of the flying capacitor 408.

Preferably, for a converter 900 as shown in FIG. 9, the flying capacitor 408 is charged so that $V_{CAP}$ equals the lesser of Vin 402 and $$\frac{\text{Vin\_max}}{2},$$

which will generally meet the conditions listed in Eq. 2 and Eq. 3 hereinabove. If the voltage across the flying capacitor 408 is too high, $Q_B$ 406 (which sees $V_{CAP}$) will break down.

R3 1034, MN4 1028 and DZ0 1032 turn on the voltage clamp 1004 during startup, when the initial charging circuit 1000 is otherwise largely unpowered.

MODE_OUT 1030 preferably goes high during load dump operation mode (three switching level operation) of the converter (400, 900) to protect the NMOS transistor 1002 (e.g., $Q_A$ 404). MN3 1006 enables the voltage clamp 1004 to float when the converter (400, 900) is in load dump operation mode. MN8 1044, MP0 1040 and R13 1038 shut off the precharge circuit if the converter (400, 900) is in load dump operation mode.

Fast_Charge 1050 goes high during load dump operation mode (three switching level operation) if the voltage of the flying capacitor 408 falls below $$\frac{Vin}{2}.$$

Maintaining the voltage of the flying capacitor 408 at $$\frac{Vin}{2}$$

during load dump operation is further described hereinbelow with respect to FIGS. 14 and 15.

FIG. 11 schematically shows an example circuit 1100 for initially charging the flying capacitor 408 before commencement of switching by the converter 400. As shown in FIG. 11, a level shifting buffer 1102 is connected to be powered by Vin 402 and a Voltage Regulator 1104 (regulating the output voltage of the level shifting buffer 1102 and providing a ground). The Voltage Regulator 1104 is powered by Vin 402, and is connected to GND 418. An input of the level shifting buffer 1102 is connected to an output of a comparator 1108, and an output of the level shifting buffer 1102 is connected to bias the gate of an output PMOS transistor 1106. The source of the output PMOS 1106 is connected to Vin 402, and the drain of the output PMOS 1106 is connected to a node $V_{CAP}$ 1110, which is also connected to the top plate of the flying capacitor 408 and to a resistor-divider network 1112. The resistor-divider network 1112 is connected to GND 418 and to an input of the comparator 1108.

More particularly, the connection between the resistor-divider network 1112 and the comparator 1108 is configured such that the voltage at $V_{CAP}$ 1110 (which indicates the voltage across the flying capacitor 408) can be compared, via a resistor R2 of network 1112, against a voltage reference $V_{REF}$ 1114. Accordingly, a node 1116 between resistors R1 and R2 of network 1112, the node 1116 corresponding to the resistor-divided $V_{CAP}$ 1110, is connected as an input to the comparator 1108 for comparison against $V_{REF}$ 1114. $V_{REF}$ 1114 is connected between another input of the comparator 1108 and GND 418. $V_{REF}$ 1114 is preferably a bandgap reference voltage. The comparator 1108 is also connected to GND 418, and powered by a connection to the Voltage Regulator 1104.

The bottom plate of the flying capacitor 408 is connected to the drain of an output NMOS transistor 1118. The source of the output NMOS 1118 is connected to GND 418, and the gate of the output NMOS 1118 is connected to an output of buffer 1120. The buffer 1120 is connected to drive the gate of the output NMOS 1118 high to turn on the output NMOS 1118, thereby connecting the bottom plate of the flying capacitor 408 to GND 418. The buffer 1120 is powered by a connection to the Voltage Regulator 1104.

Current is delivered from Vin 402, via the output PMOS 1106, to charge the flying capacitor 408. The sizes (physical device areas) of the output PMOS 1106 and the output NMOS 1118 determine the magnitude of the current that is received by and charges the top plate of the flying capacitor 408, and thus the rate at which the voltage across the flying capacitor 408 increases. The flying capacitor 408 is charged up to the input voltage Vin 402, until the voltage across the flying capacitor 408 reaches a selected maximum value. The resistor values of the resistor-divider network 1112 are selected so that when the voltage across the flying capacitor 408 reaches the selected maximum value (e.g., $$\left(e.g., \frac{Vin\_max}{2}\right),$$

as indicated by the voltage at node $V_{CAP}$ 1110, the output of the comparator 1108 changes state, causing the output PMOS 1106 to be turned off. This ends charging of the flying capacitor 408 by the circuit 1100.

Charging of the flying capacitor 408 by the circuit 1100 will also be ended when the voltage of the capacitor 408 equals Vin 402. This can be accomplished by turning off the output PMOS 1106 and the output NMOS 1118 when this condition is reached.

Figure 12:
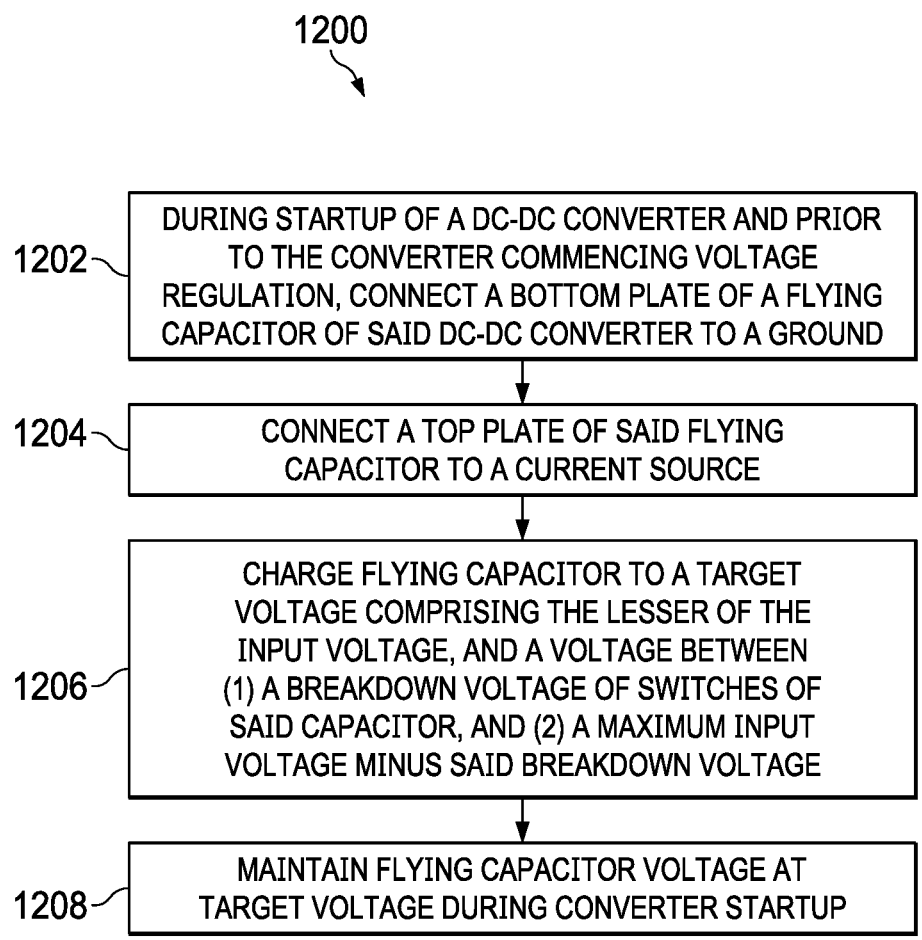
FIG. 12 shows an example process for charging the flying capacitor during cold startup of the converter (e.g., during automobile ignition).

FIG. 12 shows an example process for charging the flying capacitor 408 during cold startup of the converter 900 (e.g., during automobile ignition). During startup of the converter 900, and before the converter commencing voltage regulation, the bottom plate of the flying capacitor 408 is connected to GND 418 in step 1202. Next, the top plate of the flying capacitor 408 is connected to a current source in step 1204. The flying capacitor 408 is preferably charged to the lesser of the input voltage Vin 402, and a target voltage between: (a) the breakdown voltage of $Q_A$ 404 (i.e., the high side transistor; and in some embodiments, $Q_B$ 406, $Q_C$ 410, $Q_L$ 412 and $Q_D$ 416); and (b) the maximum input voltage Vin 402 that the converter 900 can receive minus the breakdown voltage of $Q_A$ 404, in step 1206. The voltage across the flying capacitor 408 is then maintained at the lesser of Vin 402 and the target voltage until regulation by the converter 900 (switching) begins, in step 1208.

Section III. Adaptive Control of Flying Capacitor Voltage

Repeated alternation between the second and third of three switching levels of the converter 400, as shown (respectively) in FIGS. 5D and 5E, is used to transition the converter 400 from normal operation to load dump operation. As described with respect to FIG. 5D, the second of three switching levels comprises a phase during which the inductor 414 input terminal is coupled to ground and the flying capacitor 408 is in open loop (this phase is also called a "freewheeling" phase because the flying capacitor 408 is in open loop). The transition from normal operation to load dump operation corresponds to the period between $T_1$ and $T_2$ in FIG. 7.

Preferably, when Vin 402 rises above a normal operation voltage threshold, the converter 400 begins to transition from normal operation to load dump operation by changing over to three level operation mode, as described with respect to FIGS. 5C, 5D and 5E. However, the voltage across the flying capacitor 408 is Vin 402 during normal operation and $$\frac{Vin}{2}$$

during load dump operation. To discharge the flying capacitor 408 from Vin 402 to $$\frac{Vin}{2},$$

the converter 400 preferably initially limits three level operation to repeatedly alternating between the second level (FIG. 5D) and the third level (FIG. 5E) until the voltage across the flying capacitor 408 reaches $$\frac{Vin}{2}$$

(in a 2=>3=>2=>3 pattern). Accordingly, the converter 400 alternates between being in the freewheeling phase (FIG. 5D), during which the flying capacitor 408 is in open loop, and the discharging phase (FIG. 5E), during which the flying capacitor 408 is coupled to the inductor 414 to discharge and thereby provide current through the inductor 414. The voltage across the flying capacitor 408 decreases during the discharging phase, and is constant during the freewheeling phase, meaning that alternation between the freewheeling and discharging phases will have the net effect of lowering the voltage across the flying capacitor 408. Also, the zero voltage condition is maintained, because the voltage across the inductor is positive (between Vin−Vout, and $$\frac{Vin}{2} - Vout)$$

during the discharging phase, and negative (−Vout) during the freewheeling phase. After the voltage across the flying capacitor 408 reaches $$\frac{Vin}{2},$$

the converter 400 changes to using all three of the three switching levels as described with respect to FIGS. 5C, 5D and 5E.

FIG. 13A schematically shows an example DC-DC converter 900 transitioning from load dump operation to normal operation, in a first of two switching levels 1300. FIG. 13B schematically shows an example DC-DC converter 900 transitioning from load dump operation to normal operation, in a second of two switching levels 1302. The transition from load dump operation to normal operation corresponds to the period between $T_3$ and $T_4$ in FIG. 7.

Preferably, when Vin 402 falls below a load dump operation voltage threshold, the converter 900 begins to transition from load dump operation to normal operation by changing over to two level (e.g., buck) operation mode, as described with respect to FIGS. 5A and 5B. However, the voltage across the flying capacitor 408 is $$\frac{Vin}{2}$$

during load dump operation and Vin 402 during normal operation; the flying capacitor 408 is preferably charged up to Vin 402 during this transition period. As shown in FIGS. 13A and 13B, the drain of a current source transistor 1304 is connected to the bottom plate of the flying capacitor 408. Further, the drain of the current source transistor 1304 is connected to the source of $Q_C$ 410 (which is turned off, and not shown in FIGS. 13A and 13B for clarity) and to the drain of $Q_D$ 416 (which is turned off, and not shown in FIGS. 13A and 13B for clarity). The source of the current source transistor 1304 is connected to a resistor 1306, which is connected in turn to the sources of $Q_D$ 416 and $Q_L$ 412 and to GND 418. The current source transistor 1304 and the resistor 1306 together comprise a resistor-controlled current source transistor 1308, which corresponds to the auxiliary current source 902 described with respect to the converter 900 of FIG. 9. The source-drain path of the resistor-controlled current source 1308 is thus connected between the flying capacitor 408 and GND 418 in parallel with $Q_D$ 416. The gate of the current source 1304 is preferably biased by a voltage source 1310 (e.g., Vin 402).

During the first of two switching levels, as shown in FIG. 13A, $Q_A$ 404, $Q_B$ 406 and the resistor-controlled current source 1308 are on, and $Q_C$ 410, $Q_L$ 412 and $Q_D$ 416 are off. This provides a current path for the flying capacitor 408 to charge. During the second of two switching levels, as shown in FIG. 13B, $Q_L$ 412 and the resistor-controlled current source 1308 are on, and $Q_A$ 404, $Q_B$ 406, $Q_C$ 410 and $Q_D$ 416 are off. In this second phase, the flying capacitor 408 is in open loop and its voltage is therefore unchanged.

FIG. 14 shows an example graph of voltage versus time 1400 of a circuit for auxiliary charging of the flying capacitor 408 when the flying capacitor's 408 voltage is too low during a multilevel converter operation mode. The flying capacitor's 408 voltage can drop below the $$\frac{Vin}{2}$$

target when the input voltage 402 is rapidly increasing. Rapid increase in input voltage 402 can result in the charging phase duty cycle being too short to allow the flying capacitor's 408 voltage to be maintained at $$\frac{Vin}{2}.$$

For example, the charging circuit can be circuit 1000 or circuit 1100. Preferably, auxiliary charging is performed only during a freewheeling phase, when the flying capacitor 408 is not in the same current path as the inductor 414 (such as the second phase of multi-level operation described with respect to FIGS. 5C, 5D and 5E). Accordingly, during the freewheeling phase, the flying capacitor 408 and the current source are not connected between the inductor 414 and either the input voltage 402 or GND 418. This means that when the voltage across the flying capacitor 408 is too low, that voltage can be increased towards the intended voltage of $$\frac{Vin}{2}$$

without compromising the converter's ability to maintain the zero voltage condition, and without compromising the converter's ability to continue to provide current across the inductor 414.

For example, FIG. 14 can correspond to operation of a converter 900, with a normal operation mode period 1402 and a load dump operation mode period 1404, and a period of transition 1406 from normal operation to load dump operation 1406 (such as described with respect to FIGS. 5D and 5E in Section III). During the load dump operation mode period 1404, the higher peaks 1408 correspond to flying capacitor 408 voltage during a flying capacitor 408 charging phase (FIG. 5C), and the lower peaks 1410 correspond to flying capacitor 408 voltage during a flying capacitor 408 discharging phase (FIG. 5E). Zero voltage intervals 1412 correspond to a freewheeling phase (FIG. 5D). Increased voltages 1414 during zero voltage intervals 1412 correspond to charge provided to the flying capacitor 408 by an auxiliary charging circuit (e.g., circuit 1000 of FIG. 10, and circuit 1100 of FIG. 11) to increase a flying capacitor 408 voltage that is too low, i.e., below $$\frac{Vin}{2}$$

(or other target voltage).

$$\frac{Vin}{2}$$

is a preferable target voltage because it provides leeway to avoid breaking the conditions described with respect to Eq. 2 and Eq. 3 (described herein with respect to FIG. 9).

Figure 15:
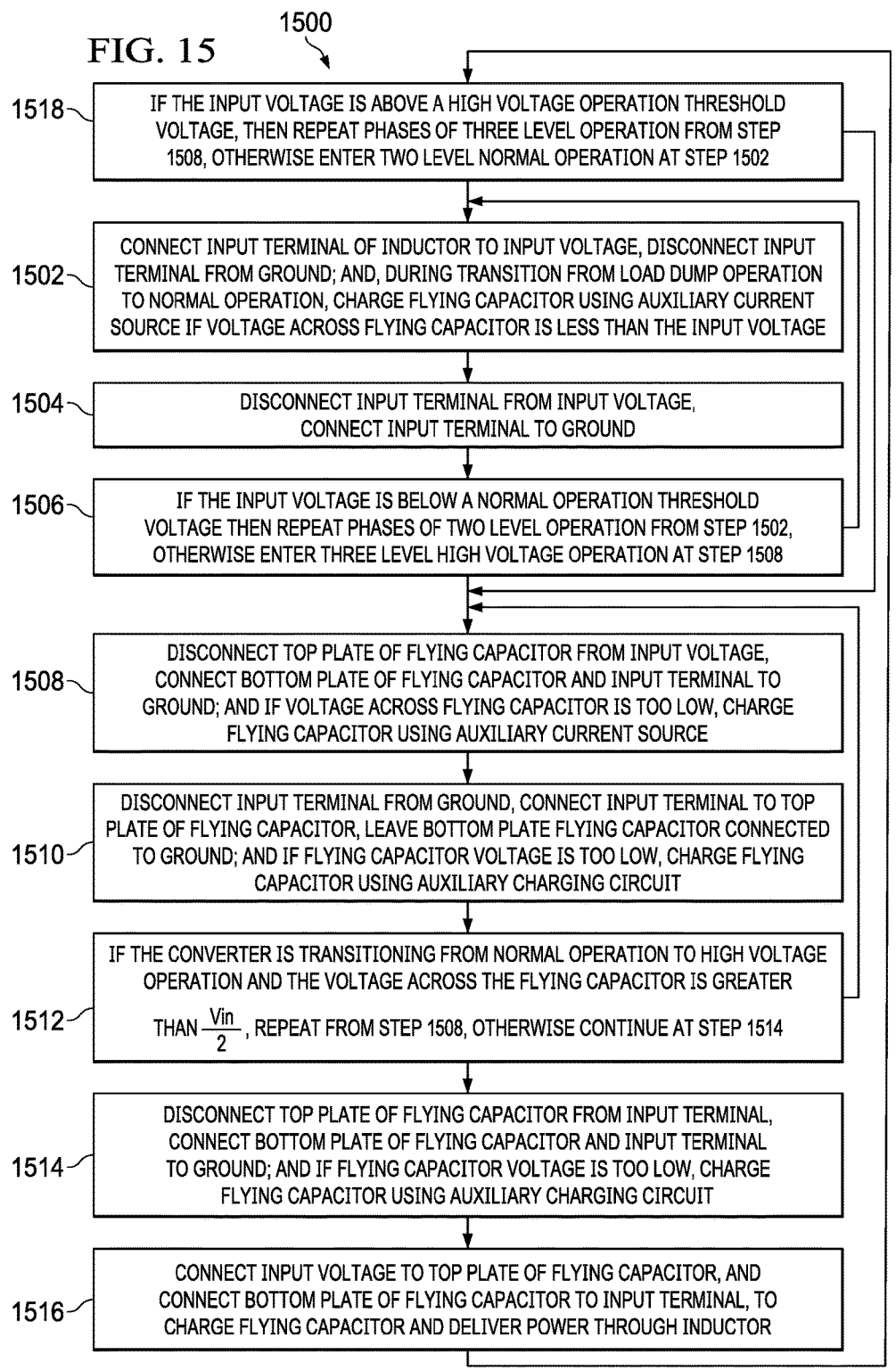
FIG. 15 shows an example process for operation of a converter that transitions between a normal operation mode and a load dump operation mode.

FIG. 15 shows an example process 1500 for operation of a converter 900 that transitions between a normal operation mode and a load dump operation mode. As shown in FIG. 15, a two level power provision cycle begins, in step 1502, with the converter connecting an input terminal of the inductor 414 to the input voltage 402 and disconnecting the input terminal of the inductor 414 from GND 418 (FIG. 5A); and, if the converter 900 is transitioning from high input voltage operation back into normal operation, and the voltage across the flying capacitor 408 is less than the input voltage 402, charging the flying capacitor 408 using an auxiliary current source 902 (FIGS. 13A and 13B). The converter 900 then disconnects the input terminal of the inductor 414 from the input voltage 402 and connects the input terminal of the inductor 414 to GND 418 in step 1504 (FIG. 5B). If the input voltage 402 is below a normal operation threshold voltage, the converter 900 repeats the two level normal power provision cycle from step 1502, otherwise the converter 900 enters high input voltage operation and transitions to a three level high input voltage power provision cycle beginning at step 1508, in step 1506.

Description of the three level power provision cycle is rearranged in FIG. 15 (2=>3=>2=>1) with respect to FIG. 8 (1=>2=>3=>2) to more easily show the transition from high input voltage operation to normal operation. Because the three level power provision is cyclical, this difference is one of presentation.

The three level power provision cycle begins in step 1508 with disconnecting the top plate of the flying capacitor 408 from the input voltage 402 and connecting the bottom plate of the flying capacitor 408 and the input terminal to GND 418 (FIG. 5D); and if the voltage across the flying capacitor 408 is too low, charging the flying capacitor 408 using an auxiliary current source (FIGS. 10, 11 and 14). The input terminal of the inductor 414 is then disconnected from GND 418 and connected to the top plate of the flying capacitor 408, and the bottom plate of the flying capacitor 408 remains connected to GND 418, in step 1510 (FIG. 5E). Pursuant to step 1512, if the converter 900 is transitioning from normal operation to high voltage operation and the voltage across the flying capacitor 408 is greater than $$\frac{Vin}{2},$$

steps 1508 and 1510 are repeated to discharge the flying capacitor 408; otherwise, the three level power provision cycle continues at step 1514 (FIGS. 5D and 5E as described in Section III).

In step 1514, the input terminal of the inductor 414 is disconnected from the top plate of the flying capacitor 408 and connected to GND 418 (FIG. 5D); and if the voltage across the flying capacitor 408 is too low, the flying capacitor 408 is charged using an auxiliary current source (FIGS. 10, 11 and 14). (Step 1514 is a return to the switch on/off configuration of step 1508.) Subsequently, the input voltage 402 is connected to the top plate of the flying capacitor 408 and the bottom plate of the flying capacitor 408 is connected to the input terminal of the inductor 414 in step 1516 (FIG. 5C). In step 1518, if the input voltage 402 is above a high voltage operation threshold voltage, the converter 900 repeats the three level power provision cycle from step 1508, otherwise the converter 900 enters normal operation and transitions to the two level power provision cycle beginning at step 1502.

Example embodiments achieve one or more of at least the following advantages. However, some of these advantages may result from only some of the example embodiments.
Enables use of low voltage transistors for both low voltage and high voltage transient power regimes;
uses the same transistors for low voltage and high voltage transient power regimes;
enable use of low voltage high side transistors;
avoids high side transistors blocking full input voltage during converter startup;
enables use of improved FOM transistors in the power converter;
enables higher power conversion efficiency; and
enables smaller power converter device area.

Methods, systems and devices are described herein for controlling provision of power using a DC-DC converter with: a normal operation two-level switching mode; and a high voltage transient multi-level switching mode that uses a flying capacitor to limit the voltage received by switching devices. In the two-level switching mode, the converter operates as a conventional converter, such as a two switch buck converter. In the multi-level switching mode, the converter has: a first phase, in which the flying capacitor charges while connected to the input voltage and an input terminal of the inductor; a second phase to meet the zero voltage condition, in which the input terminal of the inductor is connected to ground; and a third phase, in which the flying capacitor is connected between ground and the input terminal of the inductor, so that the flying capacitor discharges through the inductor. This two-mode operation enables the converter to consist of transistors rated to handle voltages at normal (lower voltage) operation levels, rather than voltages at high voltage transient levels. Because lower voltage rated transistors can be smaller and have better (lower) figures of merit, the power converter can be smaller and more efficient.

Methods, systems and devices are described herein for charging a flying capacitor during startup of a multi-level DC-DC startup to enable use of a low voltage high side transistor. By charging a flying capacitor to $$\frac{Vin}{2}$$

during startup, the high side transistor can be prevented from having to block more than the input voltage minus $$\frac{Vin}{2}$$

during startup. This enables the high side transistor to be rated for a normal operation voltage—which, in some embodiments, is as low as the maximum input voltage during startup Vin minus $$\frac{Vin}{2}.$$

Because lower voltage rated transistors can be smaller and have better (lower) figures of merit, the power converter can be smaller and more efficient.

Modifications and Variations

In some embodiments, a converter with a two level mode and a multi-level mode (three or more levels) is useful in a non-automotive system, with a normal voltage operating regime and a high voltage transient operating regime.

In some embodiments, a multi-mode converter has: a lower voltage mode of two or more levels; and a higher voltage mode of a greater number of levels. In some embodiments, a multi-level converter with more than three levels has more than one flying capacitor.

In some embodiments, normal operation and load dump operation (or other high voltage transient operation) are defined by maximum voltages other than 20 volts and 40 volts, respectively.

Some embodiments include more flying capacitors. In some embodiments, a flying capacitor can dissipate more or less than one half (e.g., three quarters or one quarter) of the input voltage.

In at least one embodiment, some hysteresis exists between the normal operation threshold and the high voltage operation threshold, such as before or after the input voltage: (a) rises above or falls below the normal operation threshold; and/or (b) rises above or falls below the high voltage operation threshold.

Additional general background, which helps to show variations and implementations, may be found in U.S. Pat. Pub. No. 20170126120, which is hereby incorporated by reference.

As shown and described herein, example embodiments include various approaches to transferring power in a DC-DC converter when the converter is specified to handle two largely separate voltage regimes, including a normal input voltage operation regime and a high voltage operation regime.

Modifications are possible in the described embodiments, and other embodiments are possible, within the scope of the claims.

What is claimed is:

1. A method of providing electrical power using a DC-DC converter comprising an inductor and a flying capacitor, the method comprising:
   in response to an input voltage transitioning from below a normal operation threshold to above the threshold, repeatedly performing a first transition phase and a second transition phase, the first transition phase comprising coupling an input terminal of the inductor to a ground, and the second transition phase comprising delivering power through the inductor by discharging the flying capacitor through the inductor; and
   after the input voltage is above the normal operation threshold, and a voltage across the flying capacitor has reached a target voltage proportional to the input voltage, repeatedly performing: a charging phase comprising charging the flying capacitor by coupling the flying capacitor to the input voltage, and delivering current from the input voltage through the inductor; a freewheeling phase comprising coupling the input terminal to the ground; and a discharging phase comprising coupling the capacitor to the input terminal to deliver current from the flying capacitor and discharge the flying capacitor through the inductor.

2. The method of claim 1, wherein the target voltage is one half the input voltage.

3. The method of claim 1, further comprising: after the input voltage is above the normal operation threshold, and the voltage across the flying capacitor has reached the target voltage, repeatedly performing in order the charging phase, then the freewheeling phase, then the discharging phase, and then the freewheeling phase.

4. The method of claim 1, wherein the target voltage is less than or equal to a selected voltage between: a breakdown voltage of multiple switches controlling the coupling and the delivering; and a maximum value of the input voltage minus the breakdown voltage.

5. The method of claim 1, wherein, during the charging phase, the freewheeling phase and the discharging phase, a voltage across each of multiple switches controlling the coupling and the delivering is less than the normal operation threshold.

6. The method of claim 1, wherein a maximum of the input voltage is at least double the normal operation threshold.

7. The method of claim 1, further comprising, before the input voltage increases above the normal operation threshold, and after the input voltage decreases below a high voltage operation threshold, repeatedly performing a first normal (N) phase and a second normal (N) phase, the first normal (N) phase comprising delivering power through an inductor from the input voltage, and the second normal (N) phase comprising coupling an input terminal of the inductor to a ground.

8. The method of claim 7, wherein the high voltage operation threshold is less than the normal operation threshold.

9. The method of claim 1, wherein the flying capacitor is in open loop during the freewheeling phase.

10. A method of providing electrical power using a DC-DC converter comprising an inductor and a flying capacitor, the method comprising:
   while an input voltage is above a normal operation threshold, and a voltage across the flying capacitor equals a selected voltage proportional to the input voltage, repeatedly performing: a charging phase comprising charging the flying capacitor by coupling the flying capacitor to the input voltage, and delivering current from the input voltage through the inductor; a freewheeling phase comprising coupling the input terminal to the ground; and a discharging phase comprising coupling the capacitor to the input terminal to deliver current from the flying capacitor and discharge the flying capacitor through the inductor; and
   after the input voltage falls below a high voltage operation threshold, repeatedly performing: a high phase comprising coupling the input terminal to the input voltage and, if a voltage of the flying capacitor has not yet increased to the input voltage, charging the flying capacitor using a current source that is not in a same current path as the inductor; and a low phase comprising coupling the input terminal to the ground.

11. The method of claim 10, further comprising: while the input voltage is above the high voltage operation threshold, repeatedly performing in order the charging phase, then the freewheeling phase, then the discharging phase, and then the freewheeling phase.

12. The method of claim 10, wherein a duty cycle of the high phase equals the input voltage divided by an output voltage.

13. The method of claim 10, wherein the high voltage operation threshold is less than the normal operation threshold.

14. The method of claim 10, wherein the selected voltage is one half the input voltage.

15. A method of providing electrical power using a DC-DC converter comprising an inductor and a flying capacitor, the method comprising:
when an input voltage is below a normal operation threshold, repeatedly performing a first normal (N) phase and a second normal (N) phase, the first normal (N) phase comprising delivering power through the inductor from the input voltage, and the second normal (N) phase comprising coupling an input terminal of the inductor to a ground; and
when an input voltage is above a high voltage operation threshold, repeatedly performing: a charging phase comprising charging the flying capacitor by coupling the flying capacitor to the input voltage and the inductor, and delivering current from the input voltage through the inductor; a freewheeling phase comprising coupling the input terminal to a ground and, if a voltage of the flying capacitor is less than a selected voltage proportional to the target voltage, charging the flying capacitor using a current source that is not coupled between the inductor and the input voltage or the ground; and a discharging phase comprising coupling the flying capacitor to the input terminal to deliver current from the flying capacitor and discharge the flying capacitor through the inductor, and decoupling the flying capacitor from the input voltage.

16. The method of claim 15, wherein the selected voltage is half the input voltage.

17. The method of claim 15, wherein, during the charging phase, the freewheeling phase and the discharging phase, a voltage across each of multiple switches controlling the coupling and the delivering is less than the normal operation threshold.

18. The method of claim 15, wherein, when the input voltage rises above the normal operation threshold, the converter repeatedly alternates between the freewheeling phase and the discharging phase until a voltage across the flying capacitor reaches the selected voltage, after which the converter repeatedly performs the charging phase, the freewheeling phase and the discharging phase.

19. The method of claim 15, wherein the selected voltage does not increase above a voltage limit between: a breakdown voltage of multiple switches controlling the coupling and the delivering; and a maximum value of the input voltage minus the breakdown voltage.

20. The method of claim 15, wherein, when the input voltage falls below the high voltage operation threshold, the converter repeatedly alternates between the first normal (N) phase and the second normal (N) phase, and charges the flying capacitor during repetitions of the first normal (N) phase if a voltage across the flying capacitor is less than the input voltage.

21. The method of claim 15, wherein the high voltage operation threshold is less than the normal operation threshold.

22. A system for regulating provision of DC-DC electrical power, comprising:
a DC-DC converter comprising a flying capacitor, an inductor and multiple switches; and
control circuitry to control the switches to:
before an input voltage increases above a normal operation threshold, and after the input voltage decreases below a high voltage operation threshold, and after a voltage across the flying capacitor reaches the input voltage, repeatedly perform a first normal (N) phase and a second normal (N) phase, the first normal (N) phase comprising delivering power through the inductor from the input voltage, and the second normal (N) phase comprising coupling an input terminal of the inductor to a ground; and
after the input voltage increases above the normal operation threshold, and the voltage across the flying capacitor reaches a target voltage proportional to the input voltage, and before the input voltage decreases below the high voltage operation threshold, repeatedly performing: a charging phase comprising charging the flying capacitor by coupling the flying capacitor to the input voltage, and delivering current from the input voltage through the inductor; a freewheeling phase comprising coupling the input terminal to the ground; and a discharging phase comprising coupling the capacitor to the input terminal to deliver current from the flying capacitor and discharge the flying capacitor through the inductor.

23. The system of claim 22, wherein the control circuitry is configured to control the switches to, in response to the input voltage transitioning from below the normal operation threshold to above the normal operation threshold, and before the voltage across the flying capacitor reaches the target voltage, repeatedly perform a first transition phase and a second transition phase, the first transition phase comprising coupling the input terminal to the ground, and the second transition phase comprising delivering power through the inductor by discharging the flying capacitor through the inductor.

24. The system of claim 22, wherein the control circuitry is configured to control the switches to, after the input voltage falls below the high voltage operation threshold, and before the voltage across the flying capacitor reaches the target voltage, repeatedly perform:
a high phase comprising coupling the input terminal to the input voltage, and charging the flying capacitor using a current source that is not in a same current path as the inductor, and
a low phase comprising coupling the input terminal to the ground.

25. The system of claim 22, wherein the freewheeling phase comprises, if a voltage of the flying capacitor is less than the target voltage, charging the flying capacitor using a current source that is not coupled between the inductor and the input voltage or the ground.

* * * * *